United States Patent [19]

Ohuchi et al.

[11] Patent Number: 5,205,137
[45] Date of Patent: Apr. 27, 1993

[54] ABSORPTION AIR CONDITIONER

[75] Inventors: Tomihisa Ohuchi, Tsukuba; Akira Nishiguchi, Ushiku; Daisuke Hisajima, Ibaraki; Seiichiro Sakaguchi, Ibaraki; Yoshifumi Kunugi, Ibaraki; Michihiko Aizawa, Ushiku; Katsuya Ebara, Mito; Hiroaki Yoda, Tsuchiura, all of Japan

[73] Assignee: Hitachi, Ltd., Tokyo, Japan

[21] Appl. No.: 755,159

[22] Filed: Sep. 5, 1991

[30] Foreign Application Priority Data

Sep. 5, 1990 [JP] Japan .................................. 2-233263
Sep. 7, 1990 [JP] Japan .................................. 2-235623

[51] Int. Cl.$^5$ .............................................. F25B 15/00
[52] U.S. Cl. .................................. 62/484; 62/324.2; 62/476
[58] Field of Search ................. 62/476, 101, 324.2, 62/484, 489

[56] References Cited

U.S. PATENT DOCUMENTS

| | | | |
|---|---|---|---|
| 4,573,330 | 3/1986 | van der Sluys et al. | 62/476 |
| 4,667,485 | 5/1987 | Ball et al. | 62/476 |
| 4,691,528 | 9/1987 | Tongu | 62/238.3 |
| 4,921,515 | 5/1990 | Dao | 62/335 |
| 4,941,329 | 7/1990 | Imura et al. | 62/476 |
| 5,067,330 | 11/1991 | Cook et al. | 62/485 |

Primary Examiner—Albert J. Makay
Assistant Examiner—William C. Doerrler
Attorney, Agent, or Firm—Antonelli, Terry, Stout & Kraus

[57] ABSTRACT

An absorption air conditioner having a regenerating chamber for heating and condensing a portion of a dilute solution generated in an absorber and an absorption chamber for causing refrigerant vapor generated in the regenerating chamber to be absorbed into said dilute solution which is at an intermediate position in the passage connected from the absorber to the regenerator so that the size of the absorber is reduced and the overall size of the absorption air conditioner is reduced.

23 Claims, 15 Drawing Sheets

ABSORPTION AIR CONDITIONER

BACKGROUND OF THE INVENTION

1. Field of the Invention

The present invention relates to an absorption air conditioner which can be suitably structured into an air-cooled structure.

2. Description of the Prior Art

In, for example, Japanese Patent Laid-Open No. 59-83717 low temperature water passes through a heat transfer pipe group disposed in an evaporator and is cooled by latent heat generated due to the evaporation of a refrigerant falling onto the heat transfer pipe group so that the cooling performance is obtained. In the heating mode, vapor of a high temperature refrigerant, generated in a high-temperature regenerator, is introduced into a medium-temperature heat exchanger to be condensed. As a result, medium-temperature water passing through the heat transfer pipe group is heated so that the heating performance is obtained.

In order to constitute an air-cooled absorption refrigerating cycle which is capable of performing the cooling operation at a density at which crystallization and solidification do not take place and at a pressure below the atmospheric pressure it is necessary for the density of an absorbent for a solution at the outlet port of the air-cooled absorber to be a low density which is substantially the same as that for the water-cooled apparatus. Accordingly, a structure has been employed which is arranged in such a manner that the air-cooled absorber is composed of a plurality of absorption units. Furthermore, the heat exchange with cooling air has been performed in such a manner that an absorption unit, disposed adjacent to a solution outlet port formed in the air-cooled absorber and in which the temperature and the density are low, is cooled by air of a relatively low temperature which is present adjacent to the inlet port. Furthermore, cooling air of a relatively high temperature, present adjacent to the outlet port, is used to cool the absorption unit which contains a relatively high temperature and high density solution to be introduced into the air-cooled absorber. As described above, the air-cooled absorber composed of a plurality of the units is employed to constitute a multipass perpendicular counterflow heat exchange cycle so that the heat exchange between cooling air and the absorption liquid are brought to an ideal state for the counterflow heat exchange. As a result, the temperature efficiency is improved so that an air-cooled double effect absorption refrigerating cycle of a water-lithium boromide system is realized. In the water-cooled system in which cooling water is, as an alternative to air, used to serve as the cooling medium for cooling the condenser and the absorber, the structure is similarly arranged such that the solution, in which the density of the absorbent is the thinnest in the cycle, is generated in the absorber.

Since the above-described conventional technology has been arranged in such a manner that the absorption liquid in which the density of the absorbent is the thinnest is generated in the absorber, the pressure of which is the lowest in the cycle, the pressure balanced temperature of absorption liquid is too low. As a result, the difference in the heat exchange temperature from the cooling medium is unsatisfactorily small. Therefore, the absorber must have an excessively large heat transfer area.

In order to reduce the size of the absorber, an absorption air conditioner has been realized in which the mass flow of the cooling medium is enlarged and thereby the temperature of the cooling medium at the outlet port is lowered so as to enlarge the heat transfer temperature difference from absorption liquid. However, excessively large energy for transferring the cooling medium, that is, an excessively large electricity input, has been required for each of the air cooling fan and the cooling water circulation pump.

Furthermore, the conventional cooling cycle cannot recover heat from a waste heat source the temperature of which is lower than the temperature level of the low-temperature regenerator.

In a case where an energy saving cycle is desired in which the quantity of the solution to be circulated can be reduced by enlarging the degree of condensation (density width) in the high-temperature regenerator or the low-temperature regenerator, the thick solution approaches the crystallization line at the largest density width because absorption liquid in which the density of the absorbent is the thinnest is generated in the absorber the pressure which is the lowest in the cycle. Therefore, crystallization can easily be taken place or the temperature level at which the high-temperature regenerator can be operated is raised excessively. As a result, there is a fear of the corrosion and the deterioration.

Another structure has been disclosed in, for example, Japanese Patent Laid-Open No. 62-202972 which is suitable to improve the temperature efficiency in the heat transfer process between cooling air and absorption liquid. However, the above-described structure has no means to enlarge the difference in the heat transfer temperature. Therefore, there arises a problem in that the air-cooled absorber must have an excessively large heat transfer area.

SUMMARY OF THE INVENTION

An object of the present invention is to provide an absorption air conditioner arranged in such a manner that the size of an absorber, which has the largest heat transfer area in the units and which is the largest unit among all of the units, is reduced so that the overall size thereof is reduced.

Another object of the present invention is to provide an absorption air conditioner the mass flow of which is reduced by enlarging the difference between the temperature of the cooling medium at the outlet port of the absorber and that at the inlet port of the same so that energy required to transfer the cooling medium, that is, the electricity input required for the air cooling fan or the cooling water circulating pump, is reduced and thereby noise can be reduced.

Another object of the present invention is to provide an absorption air conditioner having an energy saving cycle in which the degree of condensation made by the high-temperature regenerator or the low-temperature regenerator is large and as well as the operational temperature is low which is positioned away from the crystallization line.

In order to achieve the above-described objects, according to one aspect of the present invention, there is provided an absorption air conditioner having a sub-regenerating chamber for heating and condensing a portion of a dilute solution generated in an absorber and an absorption chamber for causing refrigerant vapor generated in the regenerating chamber to be absorbed into the dilute solution which is at an intermediate position in the passage connected from the absorber to the regenerator.

Furthermore, a liquid heat exchanger is provided which acts to exchange heat between the dilute solution to be supplied to the regenerating chamber and a thick solution generated in the regenerating chamber.

In addition, a heat exchanger is disposed in the regenerating chamber, the heat exchanger being capable of utilizing, as a source for heating the regenerating chamber, a high temperature fluid in the cycle, exhausted heat after heating the regenerator and/or waste heat source of a relatively high temperature or the like.

Another object of the present invention is to provide a low noise air-cooled absorption air conditioner by arranging the structure in such a manner that the difference in the heat exchange temperature between cooling air and absorption liquid is enlarged so as to reduce the size of the air-cooled absorber and as well as the difference between the temperature of cooling air at the inlet port and that at the outlet port is enlarged so as to reduce the cooling air quantity.

Another object of the present invention is to provide an air-cooled absorption air conditioner revealing durability against corrosion by lowering the operational temperature for the high-temperature regenerator and the density of the absorbent.

In order to achieve the above-described objects, according to an aspect of the present invention, there is provided an air-cooled absorption air conditioner having a high-temperature regenerator, a low-temperature regenerator, an air-cooled condenser, an evaporator, an air-cooled absorber, a high-temperature heat exchanger, a low-temperature heat exchanger, a solution pump, a refrigerant pump and a piping system for connecting them to operate them, the absorption air conditioner comprising: a heat-substance transfer means so that a thick solution to be returned from the high-temperature regenerator or the low-temperature regenerator to the air-cooled absorber and a dilute solution generated in the air-cooled absorber are made in such a manner that a solution, the density of which is thinner than that of the solution generated in the air-cooled absorber, is supplied to the high-temperature regenerator or the low-temperature regenerator.

Other and further objects, features and advantages of the invention will be appear more fully from the following description.

DESCRIPTION OF THE PREFERRED EMBODIMENTS

Figure 1:
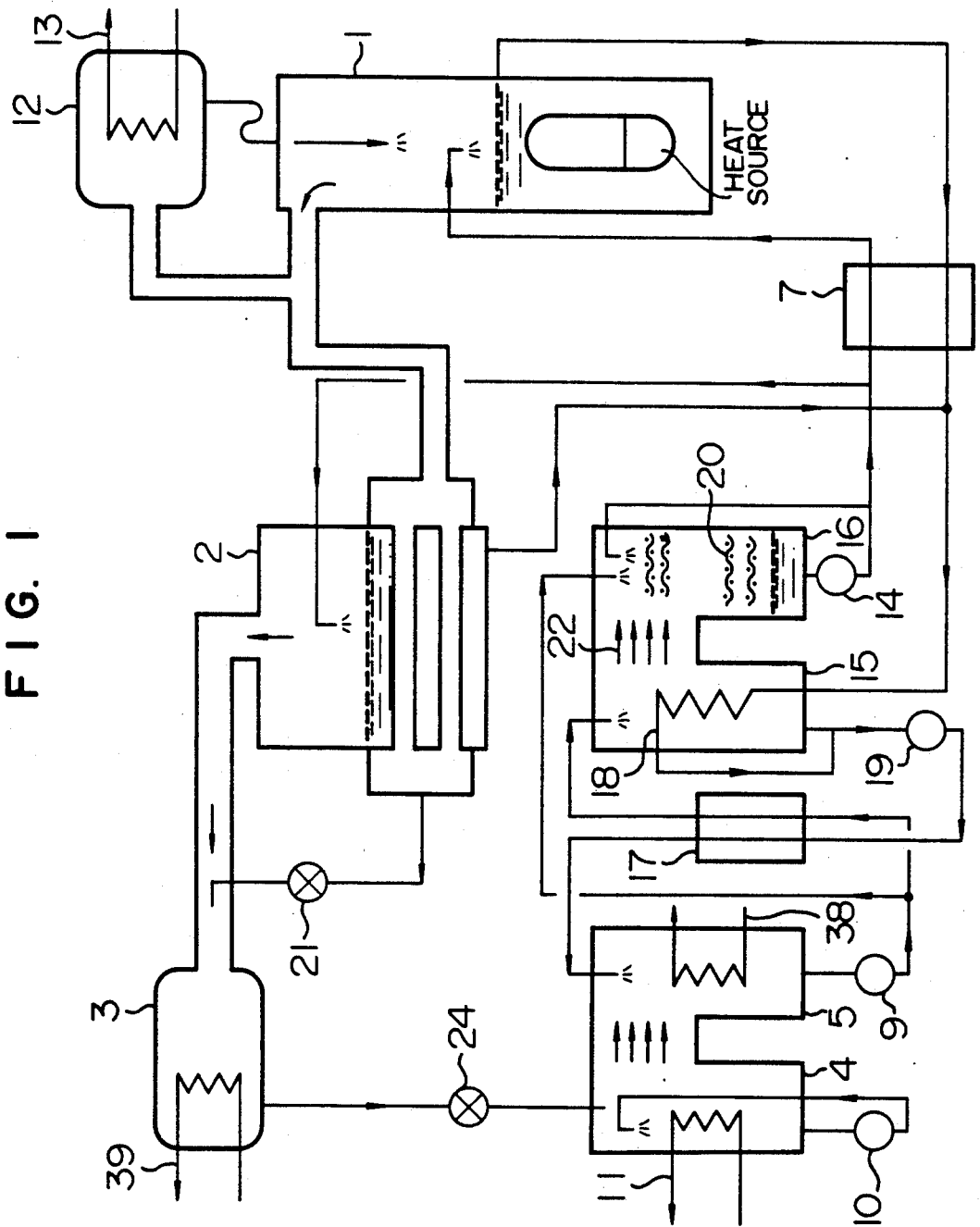
FIG. 1 is a cycle flow diagram according to an embodiment of the present invention.

Referring to FIG. 1, reference element 1 represents a high-temperature regenerator; element 2 represents a low-temperature regenerator; element 3 represents a condenser; element 4 represents an evaporator; element 5 represents an absorber; element 6 represents a low-temperature heat exchanger; element 7 represents a high-temperature heat exchanger; element 9 represents a solution pump; element 10 represents, a refrigerant pump; element 11 represents low temperature, water; element 12 represents a medium-temperature heat exchanger; element 13 represents medium-temperature water; element 14 represents a solution pump; element 15 represents a regenerating chamber; element 16 represents an absorption chamber; element 17 represents a liquid heat exchanger; element 18 represents a heat exchanger through for passing a heat medium for heating the solution in the regenerating chamber 15; element 19 represents a solution pump; element 20 represents substance to be injected into the absorption chamber 16, and element 21 represents a refrigerant pressure reducing means for reducing the pressure of a refrigerant in the high-temperature regenerator 1, which has heated the low-temperature regenerator 2. The regenerating chamber 15 and the absorption chamber 16 are connected to each other via a refrigerant vapor passage 22.

Then, the operation will now be described. The high-temperature regenerator 1 heats the solution position absorbed thereto so as to generate and condense vapor of the refrigerant. Vapor of the refrigerant thus-generated is introduced into a heat exchanger disposed in the low-temperature regenerator 2 via a vapor duct so as to heat the solution injected in the low-temperature regenerator 2, while vapor of the refrigerant is condensed and liquidized before it is introduced into the condenser 3 via pipes and the pressure reducing means 21. The high-temperature heat exchanger 7 subjects a thick solution generated by the high-temperature regenerator 1 and a thin solution to be introduced into the high-temperature regenerator 1 to heat exchange. The low-temperature regenerator 2 uses condensation latent heat of vapor of the refrigerant generated in the high-temperature regenerator 1 to heat the solution absorbed thereto so that vapor of the refrigerant is generated. As a result, the thick solution is generated. The condenser 3 introduces vapor of the refrigerant generated in the low-temperature regenerator 2 thereto so as to cool it by using cooling water 39 passing through heat transfer pipe group. Vapor of the refrigerant thus-cooled is condensed and thereby liquidized. Furthermore, the condenser 3, via the pressure reducing means 21, introduces the refrigerant formed by condensing and liquidizing vapor of the refrigerant, which has been generated in the high-temperature regenerator 1, the above-described refrigerant being condensed and liquidized in the heat exchanger of the low-temperature regenerator 2. The refrigerant thus-introduced is further cooled by cooling water 39 passing through the heat transfer pipe group. The liquid refrigerant generated in the condenser 3 is introduced into the evaporator 4 via the pressure reducing means 24 composed of an introduction pipe, a U-shape liquid seal and the like by virtue of the head positional difference or a liquid transfer means. Then, the liquid refrigerant is, by the refrigerant pump 10, spread on the heat transfer pipe group disposed in the evaporator 4. As a result, the liquid refrigerant is heat-exchanged with low temperature water 11 passing through the heat transfer pipe so that it is vaporized. At this time, latent heat generated due to the evaporation of the refrigerant cools low temperature water 11 so that cooling performance is exhibited. Vapor of the refrigerant vaporized by the evaporator 4 is introduced into the absorber 5. In the absorber 5, the thick absorbed-solutions respectively generated in the regenerating chamber 15, the high-temperature regenerator 1 and the low-temperature regenerator 2 are mixed so that a thick solution is spread on the heat transfer pipe group of the absorber 5 by the solution pump 19. The thick solution thus-spread is cooled by cooling water 38 passing through the heat transfer pipe group of the absorber 5 and is as well as diluted since it absorbs vapor of the refrigerant supplied from the evaporator 4 so that a dilute solution is generated. The dilute solution generated in the absorber 5 is partially pre-heated by the liquid heat exchanger 17 before it is introduced into the regenerating chamber 15 by the solution pump 9. The residual dilute solution is spread on the substance 20 injected into the absorption chamber 16. The dilute solution spread in the absorption chamber 16 absorbs vapor of the refrigerant generated in the reproducing chamber 15 by the high temperature medium passing through the heat exchanger 18. As a result, the temperature of the dilute solution is raised and becomes a thin dilute solution the density of the absorbent of which is thin. According to this embodiment, as the high temperature medium passing through the heat exchanger 18, the thin solution obtained by joining the thick solution supplied from a thick solution passage of the high-temperature heat exchanger 7 and that supplied from the low-temperature regenerator 2. According to this embodiment, the absorption chamber 16 has a substance 20 to be injected arranged therein, the substance 20 being able to enlarge the surface area of the solution to enlarge the area in which the gas and the liquid are brought into contact with each other so that vapor of the refrigerant can be efficiently absorbed. The high-temperature dilute solution generated in the absorption chamber 16 is partially supplied to the low-temperature regenerator 2, while the residual portion of the same is supplied to the high-temperature regenerator 1 via the high-temperature heat exchanger 7. The thick solution generated in the high-temperature regenerator 1 is mixed with the thick solution generated in the low-temperature regenerator 2 via the high-temperature heat exchanger 7 so that it is made to be a thick solution before it is introduced into the pipe of the heat exchanger 18 disposed in the regenerating chamber 15. Thus, the thick solution heats the dilute solution passing outside the above-described pipe so that vapor of the refrigerant is generated and condensed. As a result, a thick solution is generated. The thick solution generated in the regenerating chamber 15 is mixed with the thick solution cooled by the heat exchanger 18 so that a thick solution is generated to be supplied to the absorber 5 by the solution pump 19 via the liquid heat exchanger 17. The liquid heat exchanger 17 heat-exchanges the thick solution to be supplied to the absorber 5 and the dilute solution to be supplied to the regenerating chamber 15 so as to reduce the quantity of radiation which corresponds to the sensible heat of the solution in the absorber 5. Furthermore, the dilute solution to be supplied to the regenerating chamber is previously heated so that an effect can be obtained in that the quantity of vapor of the refrigerant generated in the regenerating chamber 15. The cooling cycle is constituted and operated as described above.

Then, the heating cycle will now be described. At the time of the heating mode, vapor of the high temperature refrigerant generated in the high-temperature regenerator 1 is introduced into the medium-temperature heat exchanger 12 so as to be condensed. As a result, medium-temperature water 13 passing through the heat transfer pipe group is heated so that the heating performance is obtained. The liquid refrigerant condensed and liquidized in the medium-temperature heat exchanger 12 is returned to the high-temperature regenerator 1 via the U-shape liquid seal. The heating cycle is constructed as described above.

According to this embodiment, the cooling cycle 3 is constituted by a so-called parallel flow method arranged in such a manner that the dilute solution generated in the absorption chamber 16 is, in parallel, supplied to both the high-temperature regenerator 1 and the low-temperature regenerator 2 before it is, in parallel, returned to the absorber 5. Therefore, an advantage can be obtained in that the required quantity of the solution to be circulated in each of the high-temperature heat exchanger 7, the low-temperature regenerator 2 and the high-temperature regenerator 1 can be reduced, the size of the piping can be reduced and the pressure required to operate the cycle can be lowered.

Figure 2:
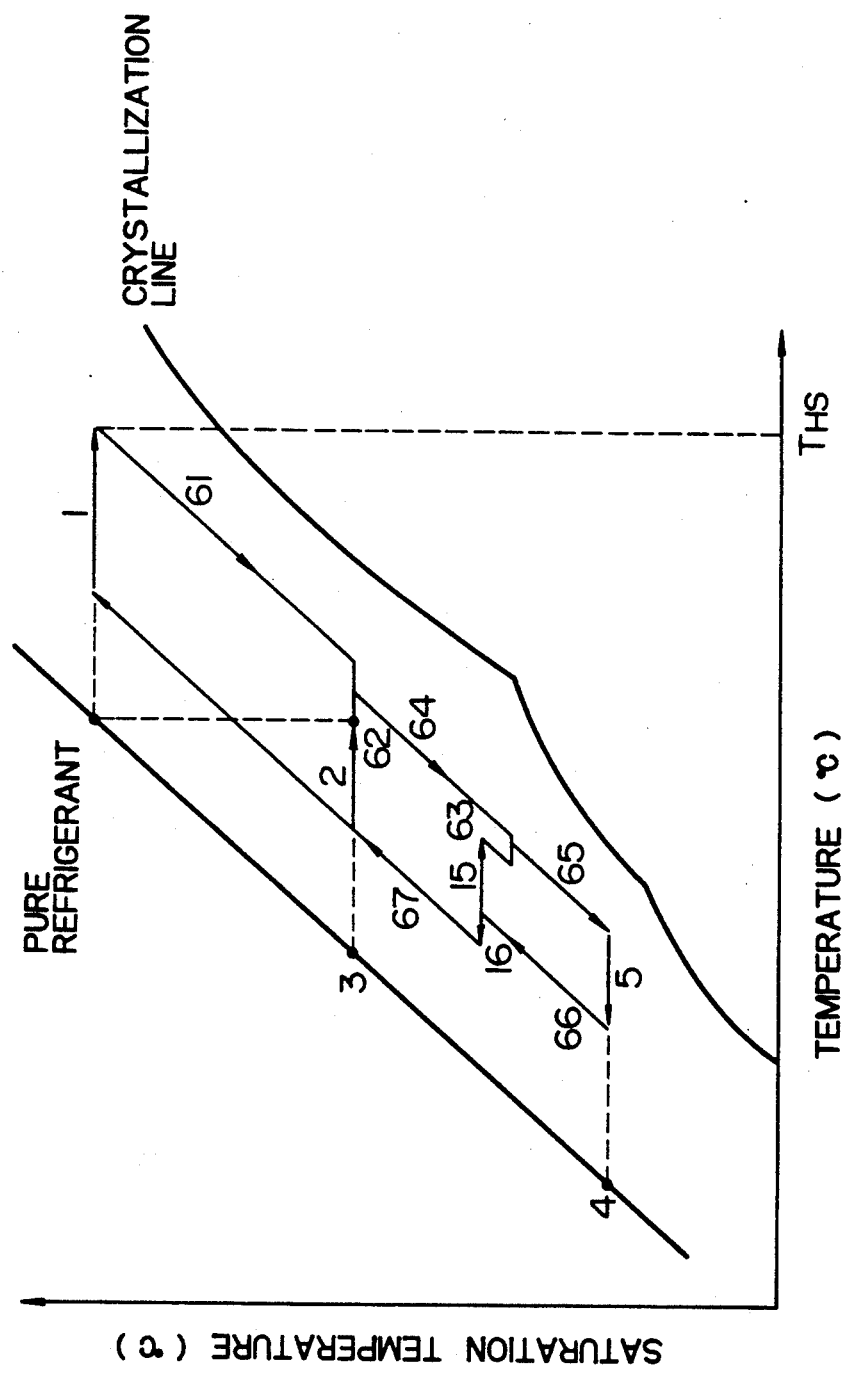
FIG. 2 is a Duehring's diagram of the cycle flow.

Referring to FIG. 2, the axis of abscissa stands for temperature, the axis of ordinate stands for the saturation temperature converted from the pressure of vapor of the refrigerant, the parameter denotes the density of the absorbent of the solution and the right end line designates the cooling cycle expressed in a Duehring's line of the crystallization line.

The thick solutions generated by the high-temperature regenerator 1 and the low-temperature regenerator 2 respectively employ, for example, lithium bromide as the absorbent and has been condensed to its crystallization limit in a case where water is employed as the refrigerator. Therefore, the cycle cannot be shifted in a direction in which the density is raised. That is, if the cycle is further shifted in the direction in which the density is raised, the cycle approaches the crystallization line, causing crystal to be crystallized. As a result, the solution cannot be circulated. However, according to this embodiment, the thin dilute solution generated in the absorption chamber 16 is supplied to the high-temperature regenerator 1 or the low-temperature regenerator 2, the above-described thin dilute solution being more thin than the dilute solution generated in the absorber 5. Therefore, the condensation width between the high-temperature regenerator 1 and the low-temperature regenerator 2, that is, the density difference between the thick solution and the dilute solution can be enlarged in comparison to the conventional structure. As a result, a required quantity of the refrigerant can be generated while reducing the quantity of the solution to be circulated. Therefore, the efficiency of the cooling cycle can be improved, causing energy saving to be realized.

In general, assuming that the heat exchanger duty is Q, the cooling medium temperature level is $T_c$, the absorption temperature level is $T_A$, the heat transmissivity is h and the heat transfer area is A, the counter current heat exchange can be expressed as follows:

$$Q = h \cdot A \cdot \frac{(T_{Ai} - T_{Co}) - (T_{Ao} - T_{Ci})}{\log\{(T_{Ai} - T_{Co})/(T_{Ao} - T_{Ci})\}} \qquad (1)$$

where suffix i denotes the inlet of the heat exchanger and suffix o denotes the outlet of the heat exchanger. Furthermore, a relationship in the Duehring's line is held such that temperature $T_A$ of the absorbed liquid holds the following functional relationship assuming that the absorbent density is $\xi$ and the refrigerant vapor pressure is P:

$$T_A F(\xi, P) \qquad (2)$$

That is, the solution temperature $T_A$ is in proportion to the absorbent density $\xi$ when the refrigerant vapor pressure is constant. However, according to the above-described embodiment in which the thick absorbed liquid is supplied from the regenerating chamber by a quantity which is larger than the quantity of the thick solution supplied from the regenerator. Therefore, the difference between the absorption temperature and that of the cooling medium can be enlarged. As a result, $T_{AO}$ in Equation (1) can be raised particularly, the heat exchange temperature difference $(T_A - T_C)$ can be enlarged and heat transfer area A can be reduced.

The absorber is usually a heat exchanger of a falling film absorption type. In this case, assuming that the flow through the film per unit width is $\Gamma$ and absorption heat transmissibility defined in consideration of the shift of vapor of the refrigerant is $h_A$, the following relationship is held:

$$h_A \nu \Gamma \qquad (3)$$

Therefore, $\Gamma$ is increased because the quantity of the thick solution supplied is enlarged, causing the absorption heat transmissibility $h_A$ is improved. Therefore, the overall heat transfer coefficient in Equation (1) can be raised, causing heat exchange to be enabled while reducing the heat transfer area A.

Furthermore, heat exchange quantity Q is expressed as follows assuming that the mass flow of the cooling medium is $W_C$ and specific heat is $C_p$:

$$Q = W_C \cdot C_p (T_{co} - T_{ci}) \qquad (4)$$

The temperature effectiveness $\phi$ of the absorber is expressed by:

$$\phi = \frac{(T_{co} - T_{ci})}{(T_{Ai} - T_{ci})} \qquad (5)$$

The number of the heat transfer units can be expressed by:

$$NTU = \frac{A \cdot h}{W_c \cdot C_p} \qquad (6)$$

Since the NTU increases in proportion to the overall heat transfer coefficient h, the same performance can be obtained if the denominator, that is the mass flow $W_c$ is reduced. If Equation (5) is, to a some extent, affected and the mass flow $W_c$ is reduced, a further larger value of the temperature effectiveness $\phi$ is required. Since the overall heat transfer coefficient h can be enlarged as described above, the mass flow of the cooling medium can be reduced. As a result, an absorption air conditioner, in which the required power to transfer the cooling medium, that is, the required electricity input for the air cooling fan, can be reduced, can be realized.

Therefore, if the apparatus is operated in such a manner that the difference between the thick solution and the dilute solution of the corresponding high-temperature regenerator 1 and the low-temperature regenerator 2 are made to be substantially the same as that employed in the conventional structure, a cycle in which the density of the dilute solution to be generated by the absorber 5 is thick can be realized. That is, the density of the solution present at the outlet port of the heat transfer pipe group of the absorber 5 can be thickened. Therefore, from the relationship of Equation (2), the pressure balance temperature $T_{AO}$ of the absorbed solution can be raised. As a result, heat transfer temperature difference $\Delta Tln$ with respect to the cooling medium 38 shown in Equation (1) can be enlarged. That is, an effect can be obtained in that heat transfer area A of the absorber 5 can be reduced, causing an absorption air conditioner the size of which can be reduced to be realized.

Since this embodiment is arranged in such a manner that the absorber 5 comprises a falling film type heat exchanger having horizontal pipe group, the flow of the thick solution can be enlarged by a quantity corresponding to the quantity of the thick solution generated in the reproducing chamber 15. As a result, the flow through the fallen film $\Gamma$ can be enlarged. Furthermore, from the relationship expressed by Equation (3), the absorption heat and substance transfer coefficient is enlarged in proportion to $\Gamma$ to the 0.5th to 0.8th power. Therefore, an effect can be obtained in that the heat transfer area A of the absorber 5 can be reduced from the relationship shown in Equation (1).

This embodiment is arranged in such a manner that the heat exchanger 18 comprises a shell and coil type heat exchanger arranged in such a manner that the thick solution is passed through the pipe, the dilute solution is spread and fallen through the liquid film, a branch pipe is disposed at a portion adjacent to the solution pump 19 and the solution is again spread on the pipe group of the heat exchanger 18. As a result, since the solution in the regenerating chamber 15 can repeatedly spread, the quantity of the flow of the solution through the liquid film can be enlarged, the solution being fallen onto the heat exchanger 18. Therefore, a further high heat transmissibility can be realized, causing an effect to be obtained in that the size of the heat exchanger 18 can be reduced.

Then, another embodiment of the present invention will now be described with reference to FIG. 3. The difference from this embodiment and the above-described embodiment shown in FIG. 1 lies as follows:

That is, the circulation of the solution to and from the regenerating unit group is performed in accordance with a so-called series flow method. That is, all of the quantity of a dilute solution generated by the absorption chamber 16 is supplied to the high-temperature regenerator 1 by the pump 14 via the low-temperature heat exchanger 6 and the high-temperature heat exchanger 7. A thick solution heated by an external heat source and thereby condensed by half is introduced into the low-temperature regenerator 2 via the high-temperature heat exchanger 7. It is then heated by vapor of the refrigerant generated in the high-temperature regenerator 1 so as to be further condensed. A thick solution generated in the low-temperature regenerator 2 is introduced into a suction pipe of the solution pump 19 via the low-temperature heat exchanger 6 so as to be mixed with the thick solution generated in the regenerating chamber 15. As a result, a thick solution is generated before it is supplied to the absorber 5 by the solution pump 19. As described above, according to this embodiment, the solution in the low-temperature regenerator and that in the high-temperature regenerator are not mixed with each other.

The source for heating the regenerating chamber 15 is condensed water generated by heating the low-temperature regenerator 2, that is, the refrigerant generated in the high-temperature regenerator 1. According to this embodiment, a pressure reducing means 21a is disposed at an intermediate position of a conduit establishing a connection between the heat transfer pipe group of the low-temperature regenerator 2 and the heat exchanger 18. Furthermore, a pressure reducing means 21b is disposed at an intermediate position of a conduit establishing a connection between the heat exchanger 18 and the condenser 3.

Since the structure according to this embodiment is constituted as described above, the sensible heat of the refrigerant which has heated the low-temperature regenerator 2 and the latent heat of a portion of the refrigerant which could not be condensed can be recovered so that the quantity of radiation of the condenser 3 is reduced. Furthermore, another effect can be obtained in that the efficiency of the cycle can be improved.

According to this embodiment, the pressure is reduced two times by the two pressure reducing means 21a and 21b disposed in an intermediate position of the conduit which establishes a connection between the heat transfer pipe group of the low-temperature regenerator 2 and the condenser 3. Furthermore, the heat exchanger 18 is disposed between them. Therefore, each of the pressure reduction levels can be controlled so that vapor of the refrigerant in the high-pressure regenerator 1 is introduced into the heat exchanger 18. As a result, the pressure level of the refrigerant to be condensed can be controlled. That is, the quantity of heat of the regenerating chamber 15 can be controlled and thereby the density of the dilute solution generated in the absorption chamber 16 can be controlled. As a result, the level of the solution density in the high-temperature regenerator 1 can be safely controlled against corrosion.

In a case where the pressure reducing means 21a or 21b is solely used, the heat can be recovered from the refrigerant in the heat exchanger 18 to realize the cooling cycle. However, in the case where the pressure reducing means 21a is solely used, an operational state is sometime realized in which heat is contrary taken away because the liquid refrigerant is evaporated in accordance with the condensation pressure level of the condenser 3. In the case where the pressure reducing means 21b is solely used, the quantity of the refrigerant introduced into the heat exchanger is enlarged if the pressure in the high-temperature regenerator 1 has been raised. As a result, also vapor of the refrigerant is mixed so that heating of the solution in the regenerating chamber 15 is activated. Also shifting of vapor of the refrigerant into the dilute solution generated in the absorption chamber 16 is activated so that an effect of diluting the density in the cycle takes place. Therefore, an effect can be obtained in that the level of the solution density in the high-temperature regenerator 1 can be shifted in a direction toward the safety side against corrosion.

Figure 3:
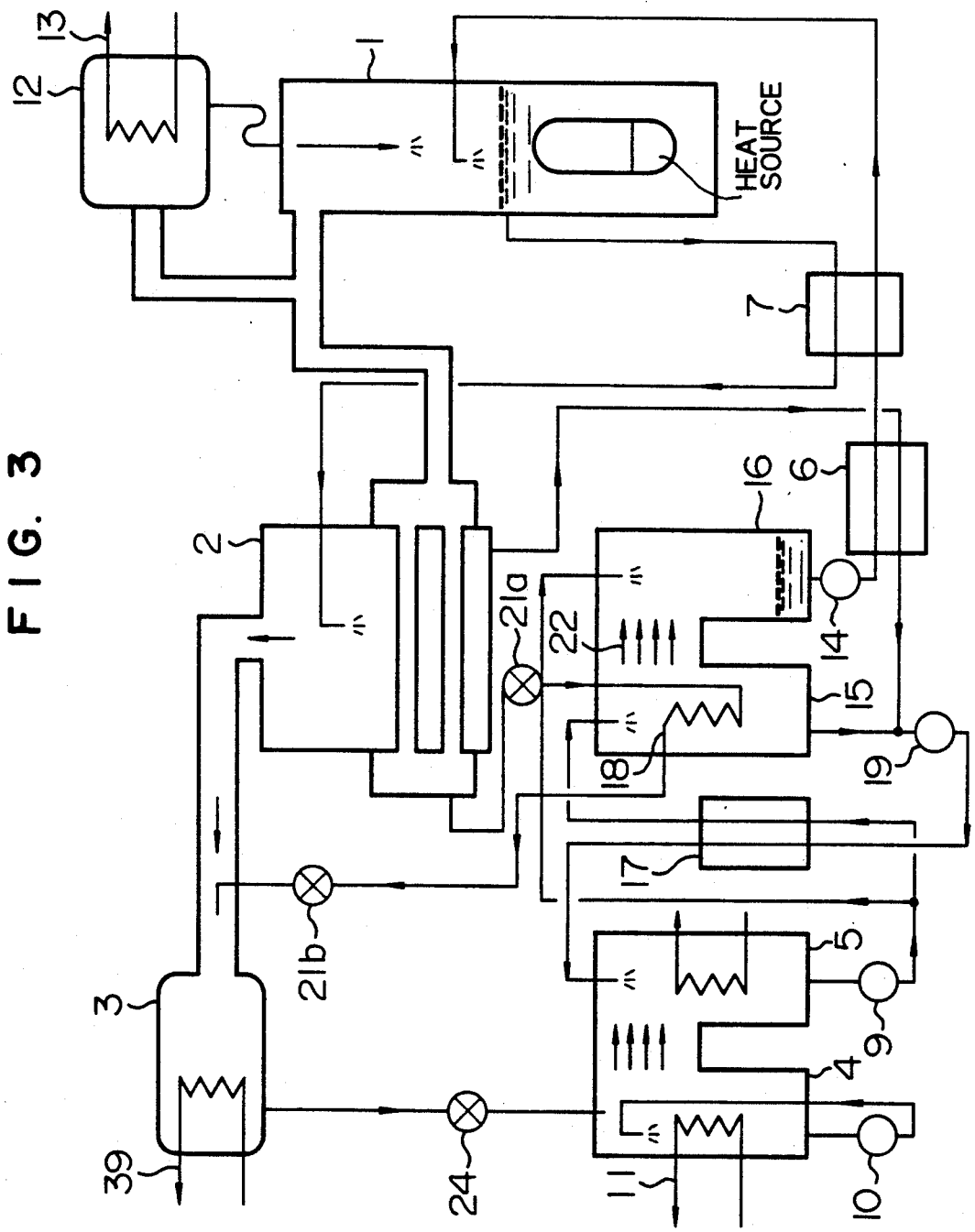
FIG. 3 is a cycle flow diagram according to another embodiment of the present invention.

If the structure according to the embodiment shown in FIG. 3 is arranged in such a manner that a heat exchanger 18a for recovering heat from the thick solution shown in FIG. 1 is further provided, heat can further efficiently recovered. According to this embodiment, a structure may be employed in which the low-temperature heat exchanger 6 is omitted from the structure and the above-described heat exchanger 18a the heat medium of which is the thick solution is disposed in the regenerating chamber 15.

Furthermore, the cycle for recovering heat from refrigerant 55 according to this embodiment can be adapted to the parallel flow shown in FIG. 1.

According to the structures shown in FIGS. 1 and 3, the thick solution generated in the regenerating chamber 15 is mixed with the thick solution condensed in the low-temperature regenerator or the high-temperature regenerator before they are supplied to the absorber 5 by the pump 19 via the heat exchanger 17. They may be individually supplied to the absorber 5. In this case, an excellent temperature efficiency can be obtained by passing only the thick solution generated by the regenerating chamber 15 through the heat exchanger 17. Therefore, an advantage can be obtained in that the size of the apparatus can be reduced.

Figure 4:
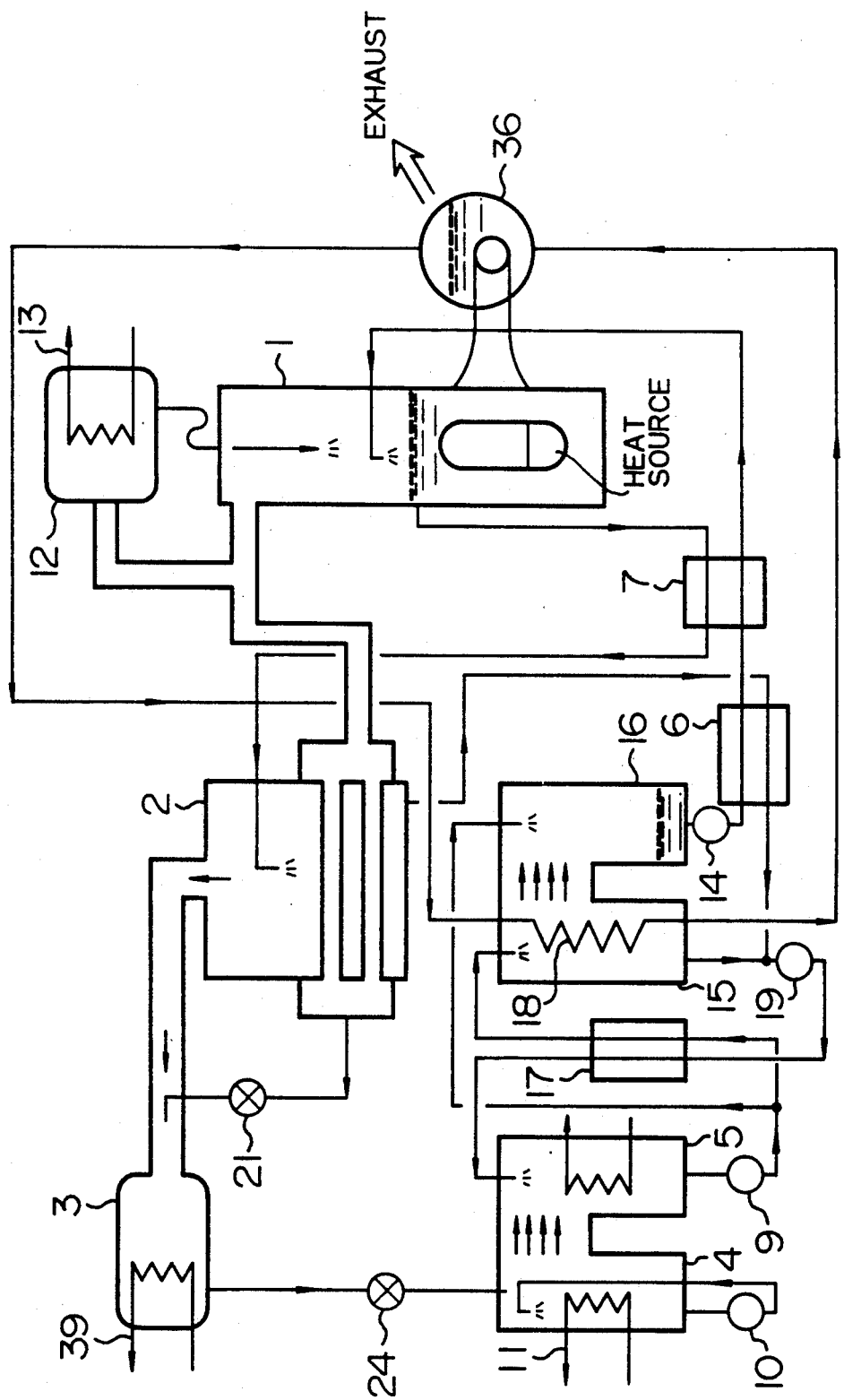
FIG. 4 is a cycle flow diagram according to another embodiment of the present invention.

Another embodiment of the present invention will now be described with reference to FIG. 4.

The difference between this embodiment and the above-described two embodiments lies in that:

That is, the source for heating the regenerating chamber 15 is a combustion gas which has heated the high-temperature regenerator 1. Furthermore, an exhaust-gas heat exchanger 36 is disposed in an exhaust gas flue of the high-temperature regenerator 1 in such a manner that the exhaust-gas heat exchanger 36 is thermally connected to the heat exchanger 18 of the regenerator 15 by a heat pipe or another means.

Since the structure according to this embodiment is constituted as described above, the thermal energy of the exhaust gas can be efficiently introduced into the cycle, causing an effect to be obtained in that the cooling performance can be improved.

By applying this embodiment, a cycle of the parallel flow type similar to that shown in FIG. 1 can be constituted. Furthermore, the structure according to this embodiment may be modified in such a manner that the heat exchanger 18 is formed into a thermo-siphon reboiler type boiler capable of directly recover heat while eliminating the heat pipe. In this case, the heat exchange with the exhaust gas can easily be performed.

Furthermore, this embodiment may be applied in such a manner that waste heat, for example, medium-temperature water heated by a solar water heating apparatus is used as the sub-medium for heating the regenerating chamber 15. In this case, an effect can be obtained in that the necessity of raising the temperature level of medium-temperature water heated by the solar water heating apparatus to about 90° C. or higher can be eliminated, the above-described temperature level being able to be realized by a conventional solar water heating apparatus which employs the selection absorption membrane or an apparatus of a vacuum tube type. Therefore, medium-temperature water of about 60° C. which can be collected by a plate type apparatus the cost of which can be reduced can be utilized. In this case, thermal energy of medium-temperature water heated by solar heat can be efficiently introduced into the cycle, causing an effect to be obtained in that the cooling performance can be improved. In this case, thermal energy recovered by the heat exchanger 18 contributes to the improvement in the cooling performance at an efficiency which is slightly inferior to that obtainable in the single effect cycle. Therefore, the waste heat the temperature level of which is high must be used as the heat source for the low-temperature regenerator 2 or the high-temperature regenerator 1 However, since extremely low cost waste heat can be utilized, it can be considered as a cycle recommended as a save energy cycle.

Figure 5:
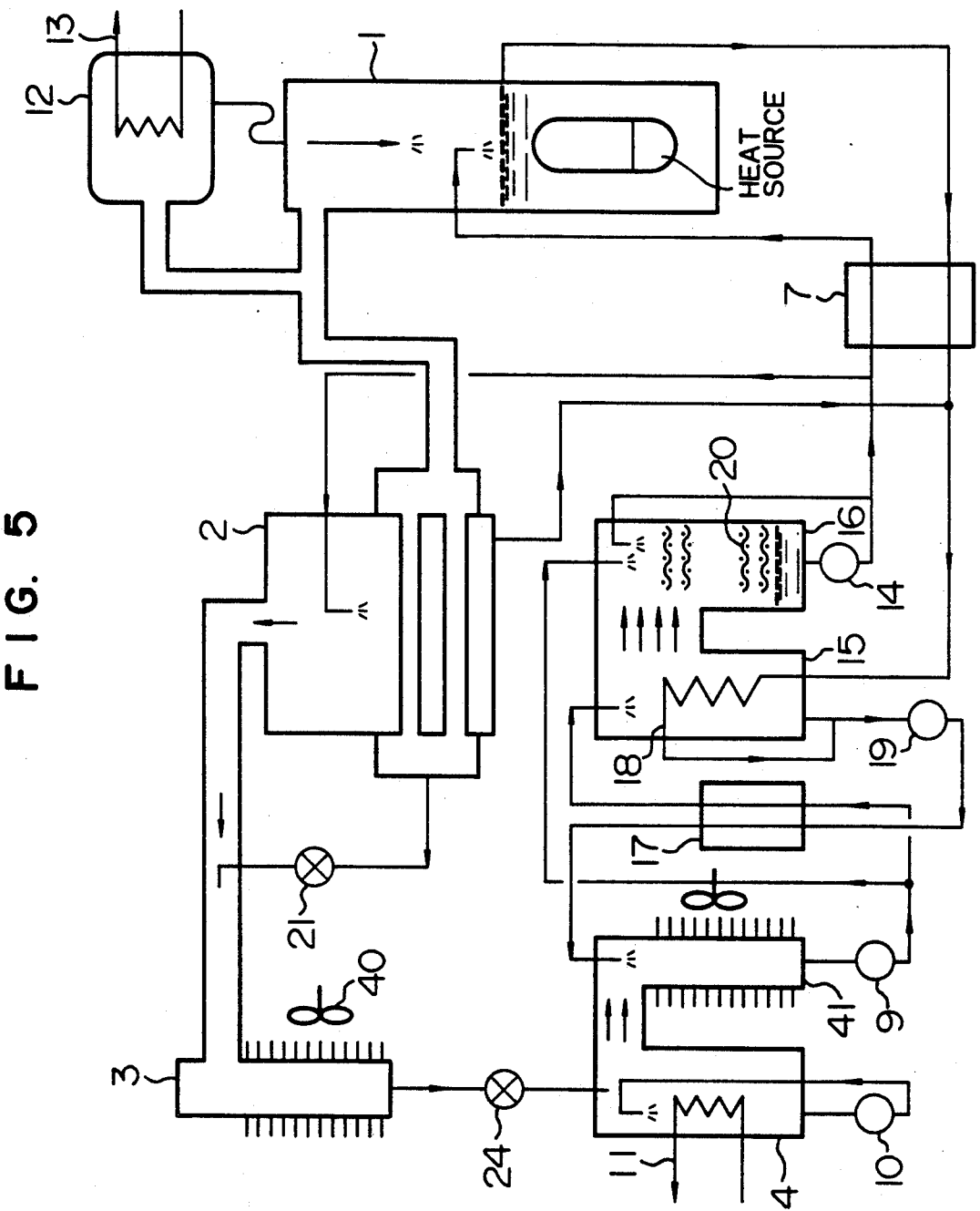
FIG. 5 is a cycle flow diagram according to another embodiment of the present invention.

Then, another embodiment of the present invention will now be described with reference to FIG. 5. The difference between this embodiment and the above-described embodiments lies in that:

That is, the condenser 3 and the absorber 5 respectively comprise air-cooled type structure cooled by cooling air supplied from an air cooling fan 8.

The air-cooled condenser 3 comprises a vapor header, a liquid header, a plurality of heat transfer pipes connected to the above-described headers, a plurality of air cooling fins fastened outside the heat transfer pipes and an air-cooling fan 40 for transferring cooling air. The above-described air-cooling fins are provided with a plurality of louvers disposed perpendicular to the direction of the air flow so as to urge the heat exchange with air to be performed efficiently. The air-cooled type condenser 3, by its vapor header, introduces vapor of the refrigerant generated in the low-temperature regenerator 2 into the transfer pipe group so as to cool it by cooled air passing outside of it, vapor of the refrigerant being then thus condensed and liquidized. Furthermore, the air-cooled condenser 3 introduces the refrigerant into the heat transfer pipe group of the air-cooled condenser 3 via the pressure reducing means 21 so as to further cool it by cooled air passing through the air cooling fin, the refrigerant being obtained by, in the heat exchanger of the low-temperature regenerator 2, condensing and liquidizing vapor of the refrigerant generated in the high-temperature regenerator 1. Cooling air is supplied to the air cooling fin of the air-cooled condenser 3. The liquid refrigerant generated in the air-cooled condenser 3 is introduced into the evaporator 4 via a pipe by a liquid transfer means.

An air-cooled absorber 41 comprises an upper header, a lower header, a plurality of heat transfer pipes connected to the above-described headers and a plurality of air cooling fins fastened outside the heat transfer pipes. Small fins are provided on the inside of the above-described heat transfer pipes so that heat/substance transfer of absorbed liquid is performed smoothly. The above-described air cooling fins are provided with a plurality of louvers disposed perpendicular to the direction of the air flow so that the heat exchange with air is efficiently performed. The upper header is provided with a liquid spreading unit for allowing thick absorbed liquid to drip into the heat transfer pipe and a solution duct for distributing absorption liquid to the heat transfer pipe group. Vapor of the refrigerant generated in the evaporator 4 is introduced into the heat transfer pipe by the upper header so that it is absorbed by thick absorption liquid allowed to drip into the heat transfer pipe by the solution duct and the liquid spreading unit. The head generated due to the absorption is radiated in cooling air via the heat transfer pipe and the air-cooling fin. Cooling air is supplied to the air-cooling fin of the air-cooled absorber 41 by the air-cooling fan 40.

Since the structure according to this embodiment is constructed as described above, the flow of the thick solution spread to the air-cooled absorber 40 can be enlarged and as well as the density of the solution at the outlet port of the air-cooled absorber 40 can be raised. Therefore, the temperature difference at the time of the heat exchange operation can be enlarged, causing an effect to be obtained in that the size of the air-cooled absorber 40 can be reduced.

According to this embodiment, the cooling cycle is constructed in accordance with the so-called parallel flow method in which the dilute solution generated in the absorption chamber 16 is, in parallel, supplied to the high-temperature regenerator 1 and the low-temperature regenerator 2 before it is, in parallel, returned to the absorber 40. Therefore, the required quantity of the solution to be circulated in each of the high-temperature heat exchanger 7, low-temperature regenerator 2 and the high-temperature regenerator 1 can be reduced. Therefore, the size of the piping systems can be reduced and as well as the pressure required to operate the cycle can be lowered.

Then, another embodiment of the present invention will now be described with reference to FIG. 6. The difference between this embodiment and the above-described embodiments respectively shown in FIGS. 1 and 3 lies in that:

That is, the dilute solution generated in the absorption chamber 16 is transferred to the low-temperature regenerator 2 via the solution pump 14 and a pipe 106. The structure is arranged in such a manner that the dilute solution is, by a branch pipe 107 branched from the pipe 106, again spread on the substance 20 to be injected in the absorption chamber 16 so that the dilute solution is further diluted. The thick solution generated and condensed by half in the low-temperature regenerator 2 is, by a solution pump 14B, supplied to the high-temperature regenerator 1 via a pipe 108a, the high-temperature heat exchanger 7 and a pipe 108b, the thick solution thus supplied being then condensed. The thick solution generated in the high-temperature regenerator 1 is spread on the heat transfer pipe group of the absorber 5 via a pipe 111a, the high-temperature heat exchanger 7, a pipe 111b and the pipe of the heat exchanger 18 in the regenerating chamber 15. The portion of overflow from the low-temperature regenerator 2 is introduced into a suction pipe 115 of the pump 19 via a pipe 122 and a U-shape liquid seal 123. The above-described overflow portion is, together with the thick solution generated by the regenerating chamber 15, then spread on the heat transfer pipe group of the absorber 5 via the heat exchanger 17 by the pump 19. A portion of it is also spread on the pipe group of the heat exchanger 18 of the regenerating chamber 15 through a branch pipe 114.

Since the structure according to this embodiment is constructed as described above, the density level of the low-temperature regenerator 2 is dilute as that realized in the parallel flow shown in FIG. 1. Therefore, the operational pressure (the pressure of the high-temperature regenerator 1) can be lowered so that an effect can be obtained in that a safety cycle can be constructed. Furthermore, since a portion of the solution is recirculated and spread on the pipe group of the heat exchanger 18 of the reproducing chamber 15 through the branch pipe 114, the heat/substance transfer of the solution in the heat exchanger 18 can be performed efficiently so that an effect can be obtained in that the performance can be improved. Similarly, the absorption chamber 16 is also constructed in such a manner that the solution is recirculated to the absorption chamber 16 through the branch pipe 107. Therefore, the opportunity at which the gas and liquid are brought into contact with each other increases so that the heat/substance transfer of the solution can be performed efficiently so that an effect can be obtained in that the performance can be improved.

Figure 7:
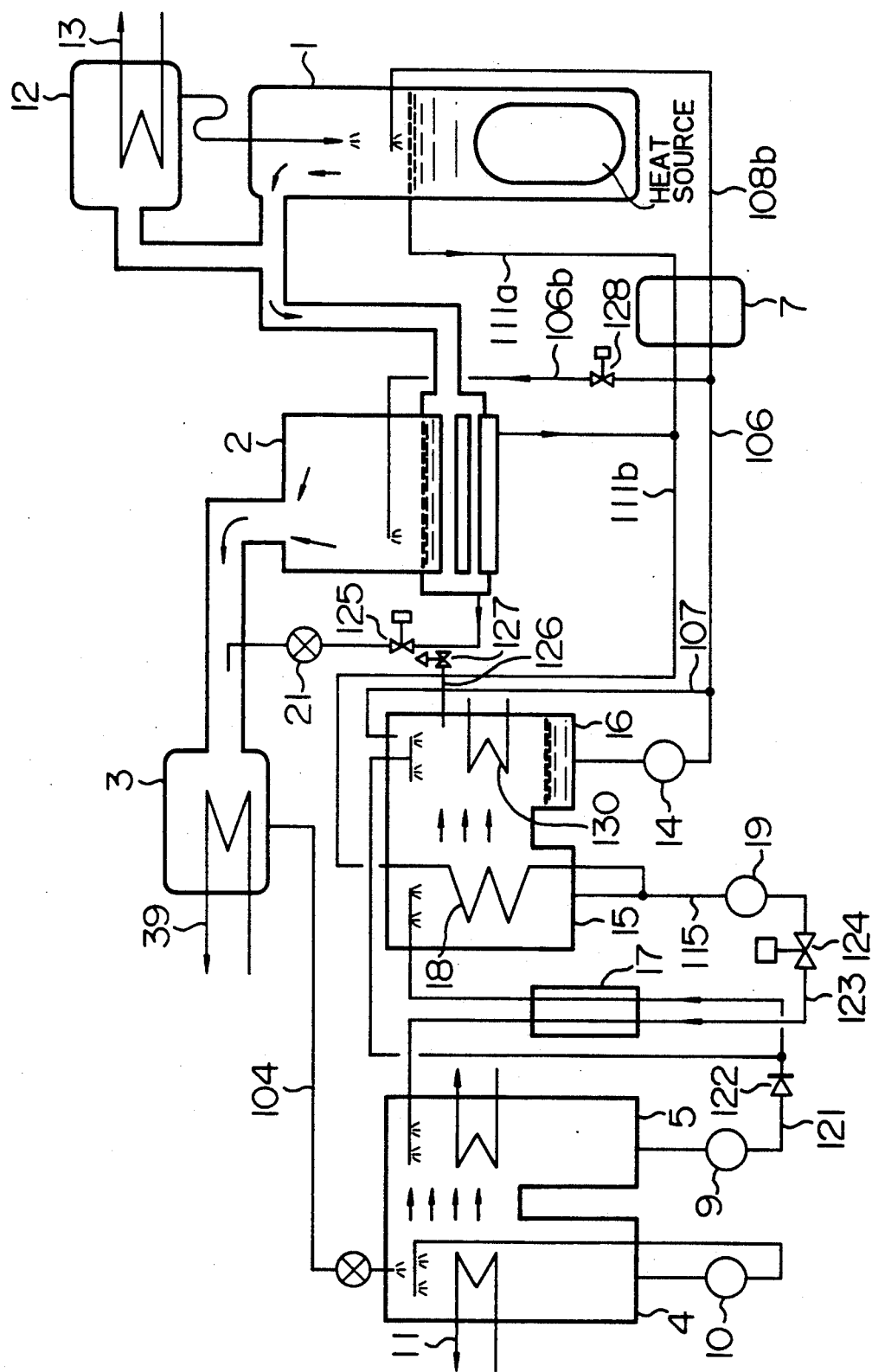
FIG. 7 is a cycle flow diagram according to another embodiment of the present invention.

Another embodiment of the present invention will now be described with reference to FIG. 7. The difference between this embodiment and the above-described embodiments shown in FIGS. 1 and 3 lies in that:

That is, a check valve 122 is disposed in a pipe 121 for sending the solution to the regenerating chamber 15 via the solution pump 9, the absorption chamber 16 and the heat exchanger 17. Furthermore, a directional control valve 124 is disposed in a pipe 123 for sending the solution to the absorber 5 from the solution pump 19 via the liquid heat exchanger 17. In addition, a directional control valve 125 disposed in the refrigerant pipe, a vapor pipe 126 branched from the route of the refrigerant and a directional control valve 127 disposed at an intermediate position of the vapor pipe 126 are respectively provided. Furthermore, a directional control valve 128 is provided in a pipe 106b branched from a pipe 106 for sending the solution to the high-temperature heat exchanger 7 from the pump and arranged to send the solution to the low-temperature regenerator 2. In addition, a heat exchanger 130 is disposed in the absorption chamber 16.

Since the structure according to this embodiment is constructed as described above, medium-temperature water for heating can be obtained by introducing medium-temperature water into the heat transfer pipe of the heat exchanger 130. That is, the three directional control valves 124, 125 and 128 are closed. When the directional control valve 127 is opened, the pumps 9, 10 and 19 are stopped so that only the pump 14 is operated. The solution in the absorption chamber 16 is introduced into the high-temperature regenerator 1 via the pipe 106, the high-temperature heat exchanger 7 and the pipe 108b. The solution is then heated by an external heat source before the solution flows back to the regenerating chamber 15 via the pipe 111a, the liquid heat exchanger 7, the pipe 111b, the heat exchanger 18 and the pipe 115. Then, it flows over the regenerating chamber 15 before it is returned to the absorption chamber 16. A high temperature solution is spread to the heat exchanger 130 by the pump 14 via the branch pipe 107. Vapor of the refrigerant generated in the high-temperature regenerator 1 passes through the heat transfer pipe of the low-temperature regenerator 2 before it is supplied to the absorption chamber 16 via the pipe 126. It is then absorbed by the solution flowing downwards on the heat exchange 130 so that medium-temperature water 13 for heating is heated by the absorption heat. Therefore, the medium-temperature heat exchanger is arranged to serve as a hot-water supply unit. Since the solution and vapor are not introduced into the absorber 5 by the action of the check valve 122 and the directional control valve 124, it can be formed into an air-cooled type unit. Similarly, the generation of vapor of the refrigerant is inhibited in the condenser 3 by the action of the directional control valve 128. Since the refrigerant is also stopped by the directional control valve 125, the condenser 3 may be arranged to be an air-cooled type unit while eliminating the risk of undesirable radiation at the time of the heating mode.

At the time of the cooling mode, the three directional control valves 124, 125 and 128 are opened so that the directional control valve 127 is closed. The solution in the absorber 5 passes through the pipe 121 and the check valve 122 before a portion of the same is introduced into the regenerating chamber 15 via the heat exchanger 17 so as to be condensed. Then, the above-described portion of the solution is spread on the absorber 5 via the pump 19, the directional control valve 124 and the heat exchanger 17. Furthermore, by operating the directional control valve 125, hot water can be obtained at any time desired. At this time, the residual solution is supplied to the absorption chamber 16 so as to be spread on the heat exchanger 130. As a result, the residual solution absorbs vapor of the refrigerant so that the solution is diluted before it is bisectioned via the pipe 106 by the pump 14. Either of the two portions is supplied to the high-temperature regenerator 1 via the heat exchanger 7 and the pipe 108b, while the other portion is supplied to the low-temperature regenerator 2 via the directional control valve 128. The thick solution generated in the high-temperature regenerator 1 is thickened because it is, via the heat exchanger 7, mixed with the thick solution generated by the low-temperature regenerator 2. The thick solution thus-obtained is, via the heat exchanger 18, mixed with the thick solution in the regenerating chamber 15 before it is spread on the absorber 5 via the pump 19, the directional control valve 124 and the heat exchanger 17.

Vapor of the refrigerant generated in the high-temperature regenerator 1 is introduced into the heat exchanger of the low-temperature regenerator 2 so that it is condensed and thereby liquidized before it is supplied to the condenser 3 via the directional control valve 125. In the condenser 3, vapor generated in the low-temperature regenerator 2 is condensed and liquidized before it is sent to the evaporator 4 via the pipe 104. Then, liquid thus formed is subjected to heat-exchanged with low temperature water 11 so that it is evaporated and gasified before it is introduced into the absorber 5. The cooling cycle is constructed as described above. At this time, when medium-temperature water is introduced into the heat exchanger, water the temperature level of which is a medium level of about 50° to 60° C. can be obtained. Therefore, the heating operation can be performed simultaneously with the heating operation. As described above, an effect can be obtained according to this embodiment in that the cooling operation and the heating operation can be performed simultaneously.

Figure 6:
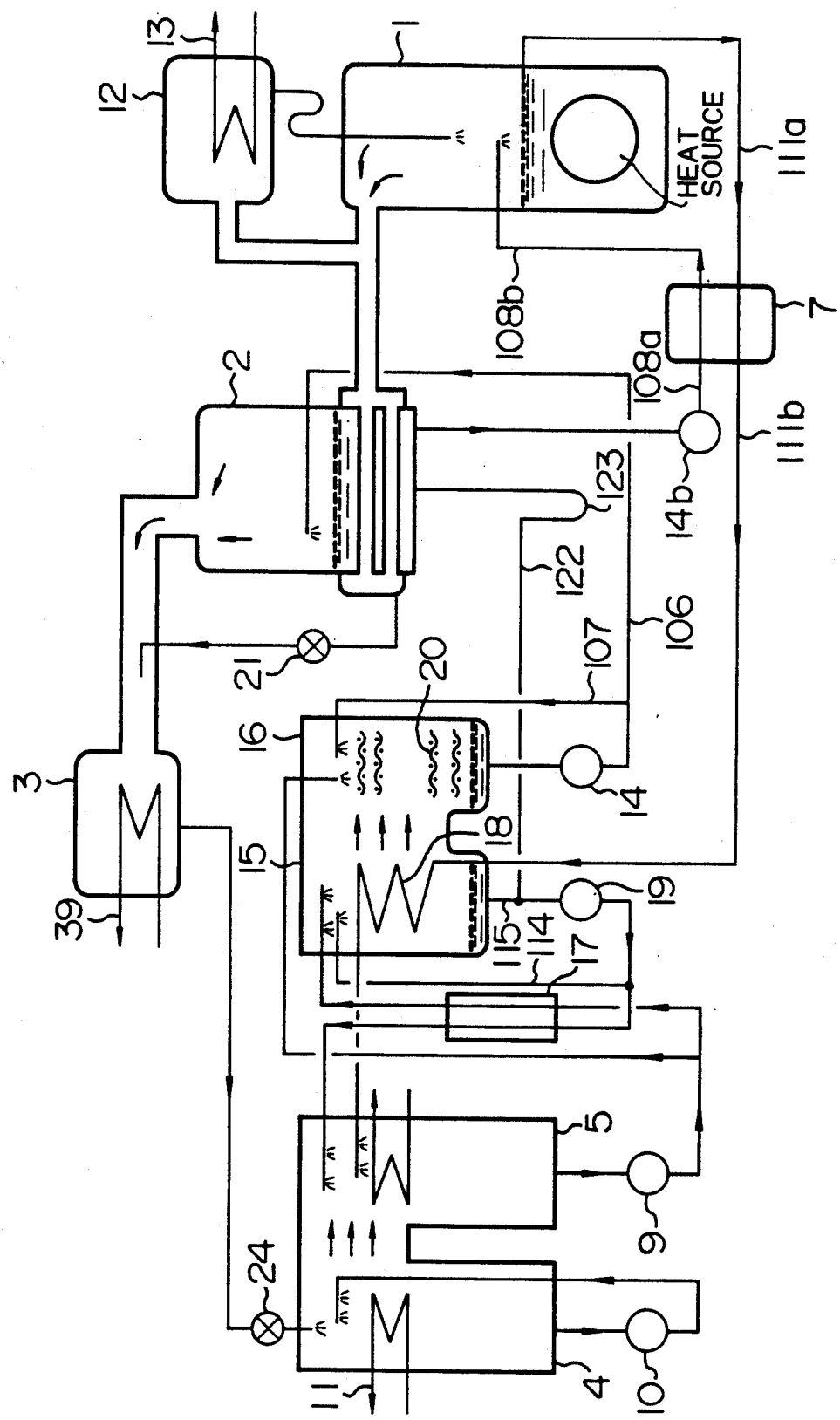
FIG. 6 is a cycle flow diagram according to another embodiment of the present invention.

Although the description according to this embodiment is made about the structure which is arranged in such a manner that the cycle for changing over the cooling operation and the heating operation comprises the parallel flow structure shown in FIG. 1, the cycle can be constituted by either of the series flow shown in FIG. 3 and the reverse flow shown in FIG. 6.

Figure 8:
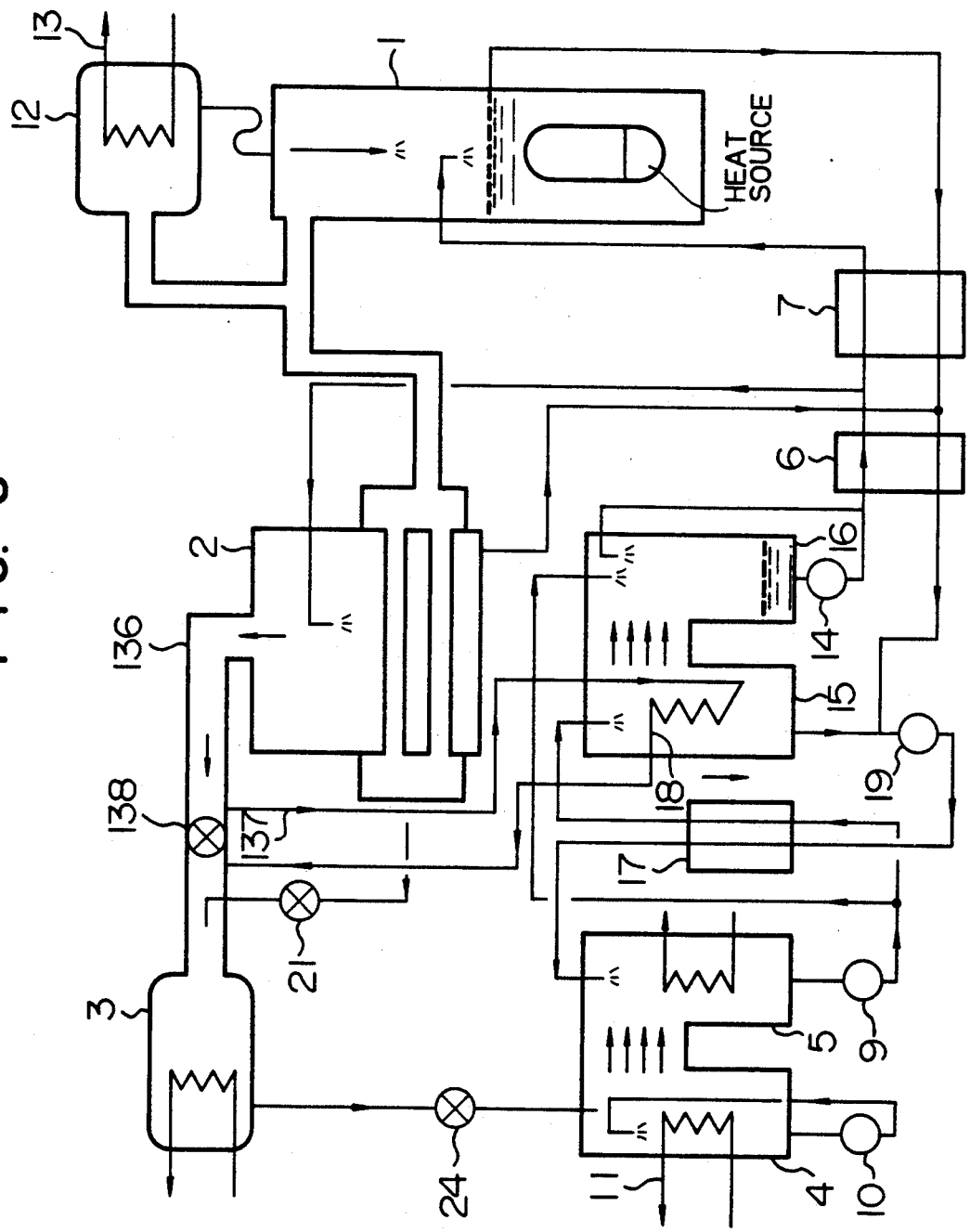
FIG. 8 is a cycle flow diagram according to another embodiment of the present invention.

Then, another embodiment of the present invention will now be described with reference to FIG. 8. The difference between this embodiment and the above-described embodiments shown in FIGS. 1 and 3 lies in that:

Vapor generated in the low-temperature regenerator 2 is introduced into the heat exchanger 18 through a pipe 137 branched from a pipe 136 for establishing a connection between the low-temperature regenerator 2 and the condenser 3 so that it is condensed and liquidized before it is introduced into the condenser 3. The pipe 136 has a stop 138 so as to control the flow of vapor of the refrigerant to be supplied to the pipe 137. Since the structure according to this embodiment is constructed as described above, heat can be recovered from vapor generated in the low-temperature regenerator 2. Therefore, a triple effect cycle can be constructed, causing an effect to be obtained in that energy can be saved.

The pumps 9, 10, 19 and the like are, of course, provided with an idle prevention means such as a protection switch arranged to be acted by detecting the liquid level.

In addition to the above-described embodiments, a modification of a type in which vapor of the refrigerant generated by heating is absorbed by the absorption liquid so as to be condensed may be employed such that the counterflow heat and material exchange is performed in a structure in which a plurality of absorption chambers 16 are provided so as to increase the number of the absorption processes from one to two or three. Another structure may be employed in which a plurality of the reproducing chambers 15 are provided so as to increase the number of regenerating processes from one to two or three. Furthermore, they may be disposed in such a manner that the difference in the vapor pressure level is enlarged.

Figure 9:
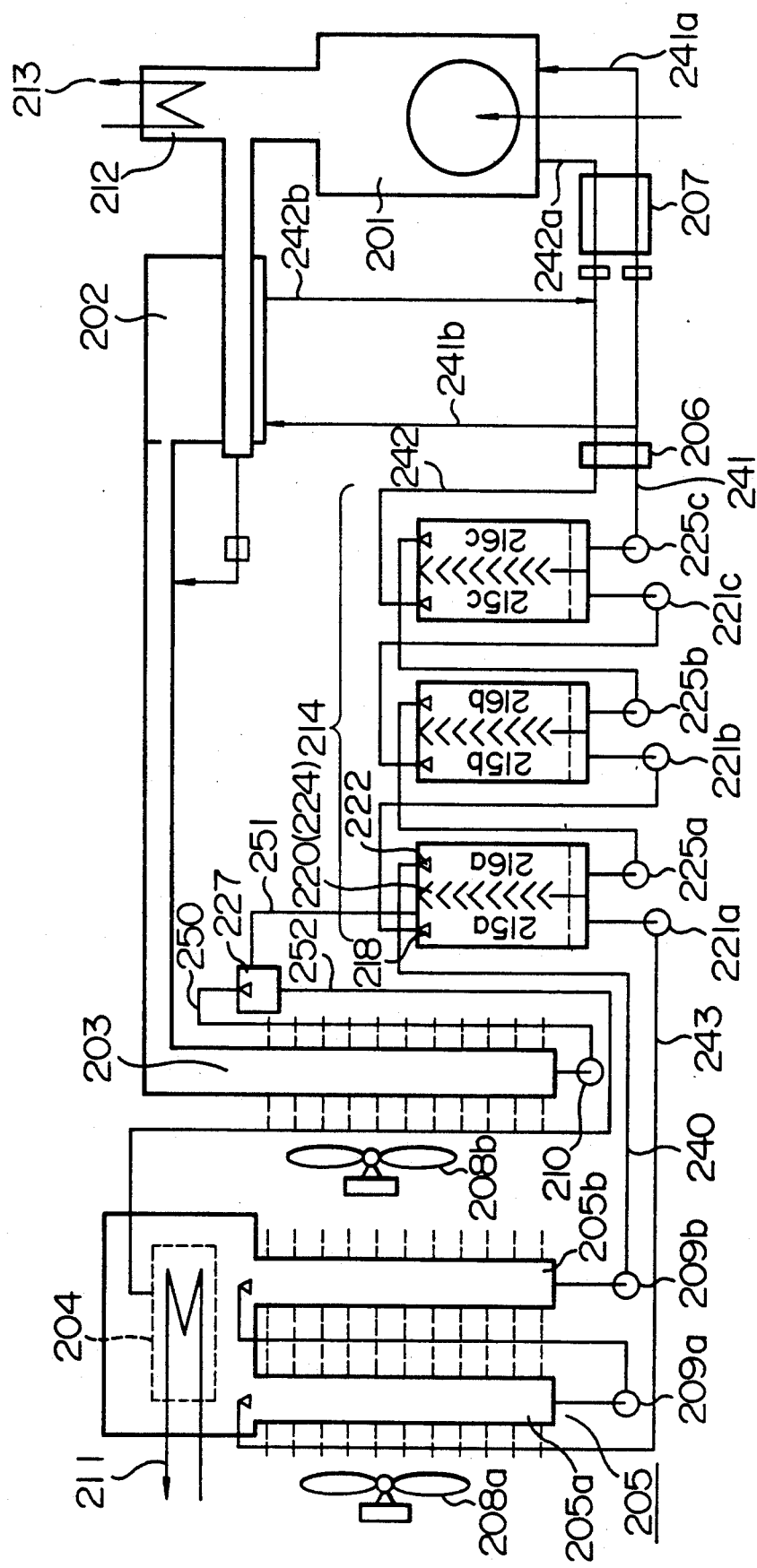
FIG. 9 illustrates the cycle system according to another embodiment of the present invention.

FIG. 9 illustrates another embodiment of the present invention which comprises: a high-temperature regenerator 201 for generating vapor of the refrigerant by heating absorption liquid so as to condense vapor of the refrigerant; a low-temperature regenerator 202 for heating the absorption liquid so as to generate and condense vapor of the refrigerant by using the condensation heat of vapor of the refrigerant generated in the high-temperature regenerator 201; an air-cooled condenser 203 for cooling vapor of the refrigerant generated in the low-temperature regenerator 202 so as to condense and liquidize vapor of the refrigerant; an evaporator 204 for evaporating liquid refrigerant generated in the air-cooled condenser 203; an air-cooled absorber 205 for causing vapor of the refrigerant generated in the evaporator 204 to be absorbed into thick absorption liquid and as well as to cool it by air; a heat-substance exchanging unit 214 into which a dilute solution generated in the air-cooled absorber 205 is introduced; a low-temperature heat exchanger 206 for subjecting a thick solution and a dilute solution to a heat exchange; a high-temperature heat exchanger 207 for subjecting the thick solution generated in the high-temperature regenerator 201 and the dilute solution to be introduced into the high-temperature regenerator 201 to a heat exchange; an air-cooling fan 208a for sending cooling air to the air-cooled absorber 205; an air-cooling fan 208b for sending cooling air to the air-cooled condenser 203; solution pumps 209a and 209b for circulating the solution in the air-cooled absorber 205; and a refrigerant pump 210 for sending the refrigerant generated in the air-cooled condenser 203 to a flush evaporating chamber 227.

In the cooling mode, low temperature water 211 passing through the heat transfer pipe group of the evaporator 204 is cooled by evaporation latent heat of the refrigerant flowing onto the heat transfer pipe group. As a result, the cooling performance is obtained.

In the heating mode, vapor of the high temperature refrigerant generated in the high-temperature regenerator 201 is introduced into a medium-temperature heat exchanger 212 so as to be condensed. As a result, medium-temperature water 213 passing through the heat transfer pipe group is heated. Thus, the heating performance is obtained.

The refrigerant generated by the above-described air-cooled condenser 203 is sent to the flush evaporating chamber 227 by the refrigerant pump 210 via a pipe 250. Then, the liquid refrigerant is introduced to the evaporator 204 from the flush evaporating chamber 227 via a pipe 252. Vapor of the refrigerant generated is introduced into the heat-substance exchanging unit 214 through a refrigerant passage 251.

In the air-cooled absorber 205 composed of two blocks, the thick solution is introduced into the absorber 205a positioned adjacent to the outlet port for cooling air so as to absorb vapor of the refrigerant generated in the evaporator 204 and is also cooled As a result, absorption liquid which is thin to some extent is generated which is then sent to the absorber 205b positioned adjacent to the inlet port for cooling air so that it is cooled. As a result, it absorbs vapor of the refrigerant so that dilute solution for the outlet port of the air-cooled absorber 205 is generated.

Figure 10:
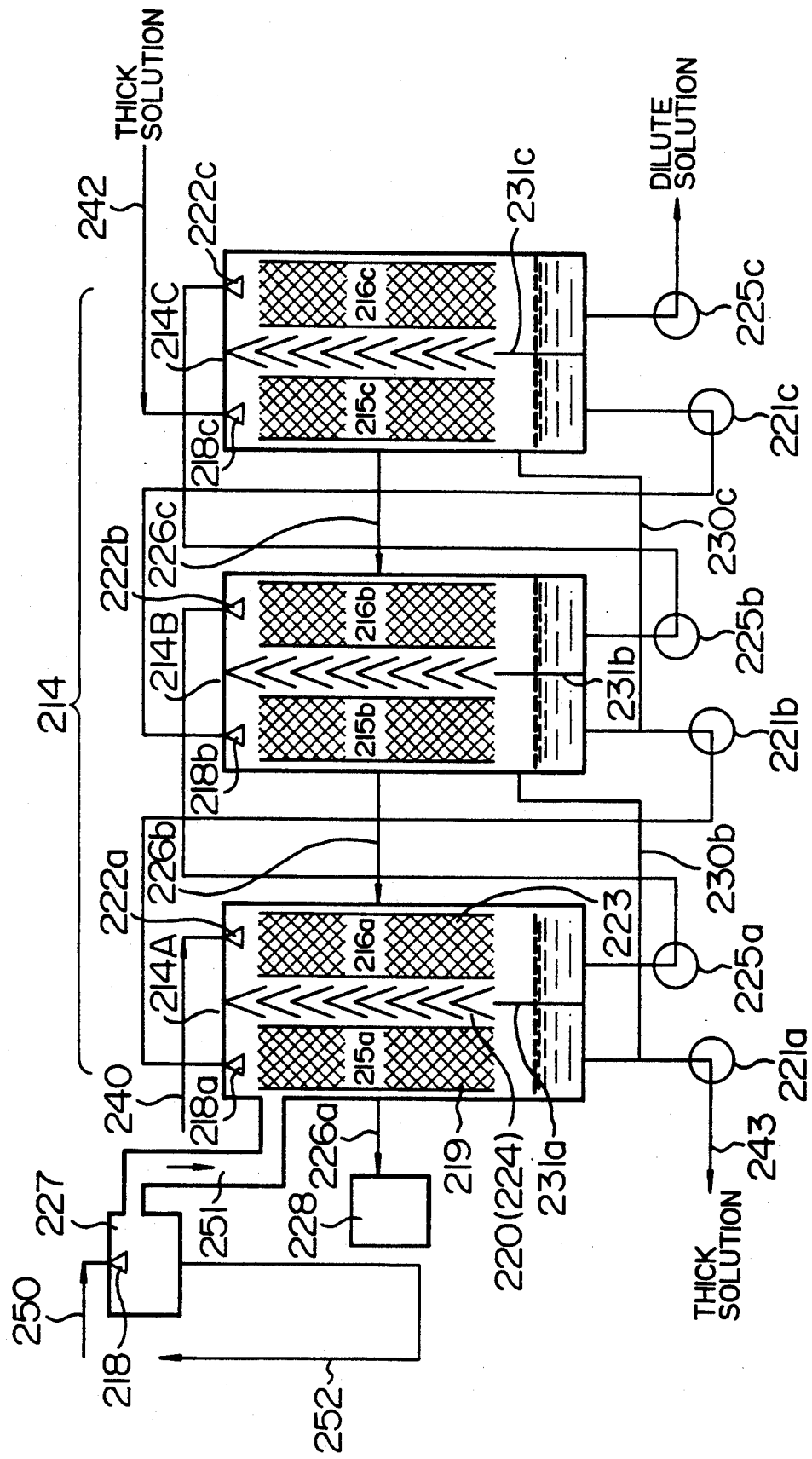
FIG. 10 is a structural view which illustrates the heat-substance exchanging unit shown in FIG. 9.

Then, referring to FIG. 10, the heat-substance exchanging unit 214 serving as the heat-substance transfer means will now be described.

The heat-substance exchanging unit 214 is composed of a plurality of (three according to this embodiment) absorbing/regenerating chamber units 214A, 214B and 214C.

Each of the absorbing/regenerating chamber units (214A, 214B and 214C) is constituted in such a manner that a regenerating chamber 215 (generic name of the absorbing/regenerating chamber units 214A, 214B and 214C) for introducing a thick solution returning from the regenerator side to the air-cooled absorber 205 so as to flush-evaporate it and an absorption chamber 216 (generic name of absorption chambers 216a, 216b and 216c) for causing the flush-evaporated refrigerant vapor to be absorbed by the dilute solution generated by the air-cooled absorber 205 are disposed to confront each other while interposing solution removal means (eliminators) 220 and 224 so that a passage for vapor of the refrigerant is created.

Each of the absorbing/regenerating chamber units 214A, 214B and 214C is arranged in such a manner that the regenerating chambers 215a, 215b and 215c for the corresponding stages are provided with a thick solution spreading means 218 (218a, 218b and 218c) made of punching plates in the upper portion of the regenerating chamber 215. Furthermore, a gas-liquid interface area enlarging means 219 is injected below the thick solution spreading means 218.

The material to be injected for the purpose of enlarging the gas-liquid interfacial area is, as shown in FIG.

12, injected in such a manner that a plurality of wave-net-like materials 219a and a plurality of saw-tooth like materials 219b are alternately disposed. Furthermore, an opening portion is formed in a direction in which vapor passes (in the horizontal direction) designated by an arrow so that a passage through which vapor of the refrigerant is created.

The regenerating chamber 215 thus-constructed is connected to the absorption chamber 216 via a liquid droplet removal means 220, that is, the eliminator.

In the lower portions of the regenerating chambers 215a, 215b and 215c, thick solution pumps 221 (221a, 221b and 221c) serving as the thick solution transfer means for transferring it to the ensuing step are disposed.

On the other hand, each of the absorption chambers 216a, 216b and 216c in the absorbing/reproducing chamber units 214A, 214B and 214C has dilute solution spreading means 222 (222a, 222b, 222c) in the upper portion of the absorption chamber 216. A gas-liquid interfacial area enlarging means 223 is injected below the dilute solution spreading means 222.

The material to be injected for the purpose of enlarging the gas-liquid interfacial area is, similarly to the material to be injected in the regenerating chamber, injected in such a manner that net-like materials formed into wave or sawtooth shapes are alternately disposed. Furthermore, a horizontal directional opening portion is formed.

The absorption chamber 216 thus-constructed is connected to the confronting regenerating chamber 215 while interposing the liquid droplet removal means 224 for preventing the undesirable flow of solution mist into the regenerating chamber 215.

Furthermore, dilute solution pumps 225 (225a, 225b and 225c) serving as the dilute solution transfer means for transferring it to the ensuing process are disposed in the low portion of the absorption chambers 216a, 216b and 216c.

Then, the operation of the portion including the heat-substance exchanging unit 214 and the liquid level control will now be described.

The dilute solution generated in the air-cooled absorber 205 is sent from the absorber 205b by the solution pump 209b through a pipe 240 to the absorption chamber 216a of the first absorption/regenerating unit 214A of the heat-substance exchanging unit 214 so as to be spread from the dilute solution spreading means 222a to the gas-liquid interfacial area enlarging means 223. The dilute solution is, by the dilute solution pump 225a, sent to the next absorption chamber 216b before it is similarly sent by the dilute solution pump 225b to the next (final) absorption chamber 216c. Then, the dilute solution is sent to the regenerator side by the dilute solution pump 225c through a pipe 241. That is, the dilute solution is bisectioned in such a manner that either of the two portions is sent to the low-temperature regenerator 202 via a pipe 241b and another portion is sent to the high-temperature regenerator 201 via the high-temperature heat exchanger 207 and a pipe 241a.

The solution in the high-temperature regenerator 201 is heated by an external heat source so as to be condensed before it is introduced into the high-temperature heat exchanger 207 via a pipe 242a so as to exchange heat with the dilute solution. Then, the above-described solution is, together with the thick solution introduced from the low-temperature regenerator 202 through the pipe 242b, sent to the final absorbing/reproducing unit 214c of the heat-substance exchanging unit 214 through the pipe 242. That is, the thick solution is introduced into the regenerating chamber 215c before it is spread from the thick solution spreading means 218c to the gas-liquid interfacial area enlarging means 219. The thick solution evaporates, by its thermal energy, vapor of the refrigerant so that the temperature of the solution is lowered. Furthermore, it is condensed before it is sent to the regenerating chamber 215b by the thick solution pump 221c. Vapor of the refrigerant generated in the reproducing chamber 215b is introduced into the absorption chamber 216b so as to be absorbed by the dilute solution.

In the regenerating chamber 215a, vapor of the refrigerant is evaporated by thermal energy of vapor refrigerant at a pressure lower than that in the regenerating chamber 215b. As a result, the temperature of the solution is lowered and is condensed before it is introduced into the absorber 205a, which is a high-temperature block, of the air-cooled absorber 205 via the thick solution pump 221a via a pipe 243.

Vapor of the refrigerant generated in the regenerating chamber 215a is introduced into the absorber 216a so as to be absorbed by the dilute solution. Furthermore, vapor of the refrigerant evaporated in the flush evaporating chamber 217 is also supplied to the absorption chamber 216a so as to be absorbed by the dilute solution. Therefore, the evaporator 204 is supplied with the liquid refrigerant the temperature of which is lower than that of the liquid refrigerant generated by the air-cooled condenser 203. As a result, the quantity of the refrigerant required for the air-cooled absorber 205 can be reduced. Therefore, the thermal load can be reduced, causing an effect to be obtained in that the efficiency of the air-cooled absorber 205 can be improved.

Furthermore, non-condensed gas is extracted from the absorption chamber 216c into the absorption chamber 216b via an extraction pipe 226c. Then, the non-condensed gas is extracted from the absorption chamber 216b to the absorption chamber 216a via an extraction pipe 226b. Furthermore, it is then extracted and scavenged from the absorption chamber 216a via an extraction pipe 226a into an automatic extraction unit 228 so as to be automatically discharged outside the apparatus by an exhaust unit (omitted from illustration). Therefore, the non-condensed gas in the apparatus can be efficiently exhausted so that effects can be obtained in that the substance transfer efficiency of the apparatus can be maintained at a satisfactory high level and that the solution circulation can be smoothly performed.

As described above, the thick solution spreading means 218 is disposed in the upper portion of each of the regenerating chambers so that the hot and thick solution is spread on the gas-liquid interfacial area enlarging means 219 disposed below it through spraying punched holes. Therefore, the generation of vapor of the refrigerant can be performed efficiently due to the large surface area.

In addition, since the material to be injected has the net which is bent into the wave-like or sawtooth like shape, the formation of the fallen droplet into fine diameter mist and the undesirable flowing of the fine mist into the absorption chamber 216 can be prevented.

Even if the material to be subjected is not present in the structure, the generation of vapor of the refrigerant can be completed quickly by simply forming the droplet.

The absorbing/regenerating chamber units 214A, 214B and 214C are connected to one another by solution communicating pipes 230 (generic name of 230b and 230c) so that the liquid level of the regenerating chamber 215 is controlled. The lower portion of the regenerating chamber 215a and the gas-phase portion of the regenerating chamber 215b are connected to each other by means of a communicating pipe 230b via a U-shape liquid seal. Furthermore, the lower portion of the regenerating chamber 215b and the gas-phase portion of the regenerating chamber 215c are connected to each other by means of a communicating pipe 23c via a U-shape liquid seal. Therefor, the liquid level in the regenerating chamber 215c is moved upwards, the solution is sent to the ensuing regenerating chamber 215b via the above-described communicating pipe 230c.

Although omitted from the illustration, it is preferable that the lower portion of the air-cooled absorber 205a and the regenerating chamber 215a be connected to each other via a U-shape liquid seal. In this case, a fact that the thick solution of a great quantity is left in the regenerating chamber 215 can be prevented.

For example, the solution passage of the above-described communicating pipe 230 can be secured even if the piping is solidified due to crystallization. Therefor, the undesirable introduction of the thick solution into the dilute solution side so that an advantage can be obtained in that the operation of the cycle can not be stopped. If the thick solution is introduced into the dilute solution side, the thickness of both of the solution in the high-temperature regenerator 201 and that in the low-temperature regenerator 2 is raised, causing the operational pressure to be raised. Furthermore, the operational temperature is also raised, causing a risk of a critical failure to arise.

The dilute solution system of the apparatus according to this embodiment is arranged in such a manner that weirs 231 (231a, 231b and 231c) of the liquid level control means are disposed to prevent the communication of the solution between the regenerating chamber 215 and the absorption chamber 216 in the lower portion of each of the chambers 215 and 216. If the liquid level in the absorption chamber 216 is raised, the solution flows over the weir 231 so that the dilute solution is introduced into the regenerating chamber 215. In this case, the opening portion of the regenerating chamber 215 of the above-described communicating pipe 230 is positioned lower than that of the above-described weir 231. As described above, the liquid levels of the regenerating chambers 215a, 215b, 215c, the absorption chambers 216a, 216b and 216c can be balanced.

It is preferable that the depth of each of the absorption chamber 216 and the regenerating chamber 215 be made to be a small depth for the purpose of reducing the pressure loss to improve the efficiency. Therefore, an effect of reducing the cost can be obtained in a case where the absorption chamber 216 and the regenerating chamber 215 are disposed to confront each other and formed into a rectangular parallelopiped and a plurality of the absorbing/regenerating units are integrally manufactured. As an alternative to this, a concentrically cylindrical structure may be employed in which the absorption chamber 216 is disposed to surround the regenerating chamber 215. As an alternative to this, the regenerating chamber 215 is disposed in a concentrically cylindrical shape to surround the absorption chamber 216.

Then, the cycle system according to this embodiment will now be described with reference to a Duehring's diagram shown in FIG. 11. The cycle is constituted in a clockwise direction. The reference numerals shown in the diagram correspond to the units according to this embodiment and symbols a, b and c denote the operational pressures of the regenerating/absorbing chamber units.

Figure 11:
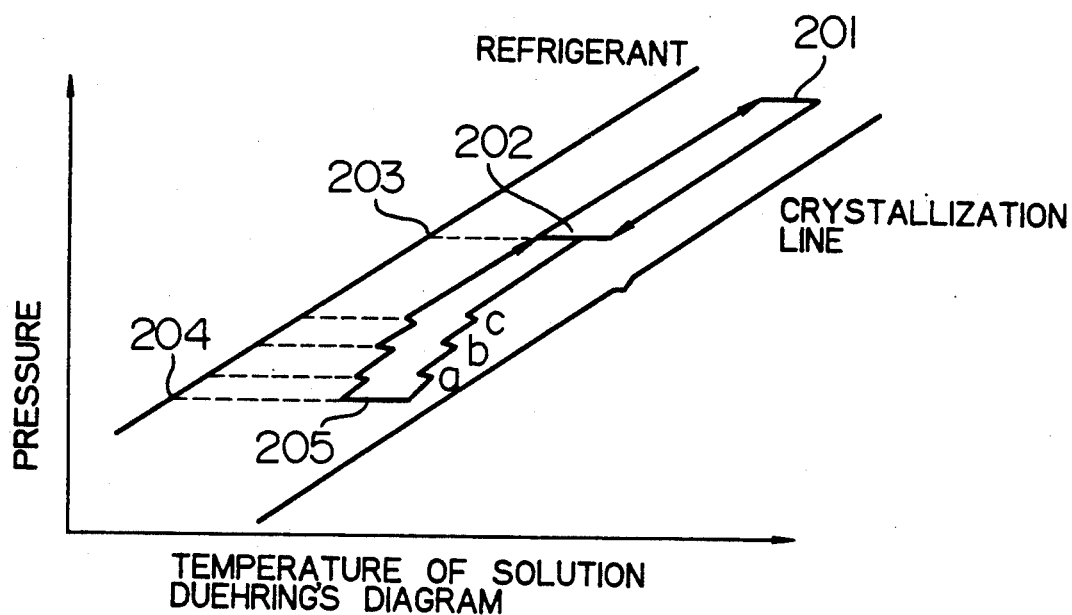
FIG. 11 is a Duehring's diagram of the cycle shown in FIG. 9.
Figure 12:
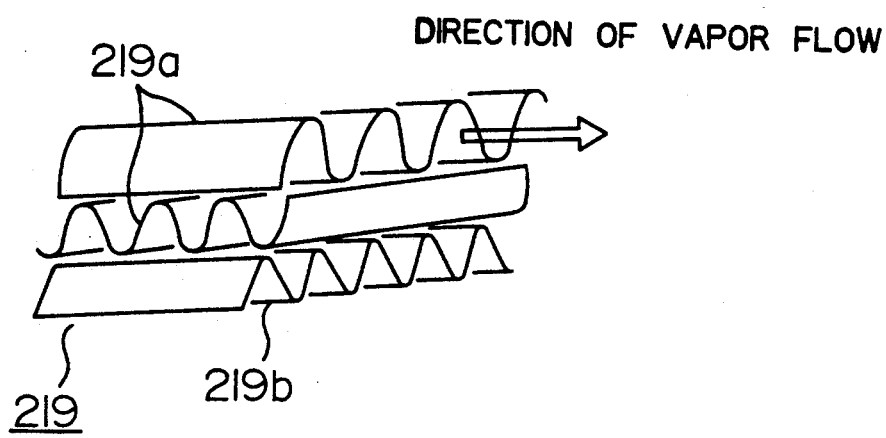
FIG. 12 is a partial perspective view which illustrates the structure of a material to be injected.

As shown in FIG. 11, the dilute solution in the absorber 205 absorbs vapor of the refrigerant in the absorption chamber 216 so that the pressure of the dilute solution is gradually raised in a step-like manner from a, b to c. As a result, it is gradually diluted, causing the thickness of the dilute solution generated in the absorption chamber 216 to be lower than that in the absorber 205.

On the other hand, the regenerating chamber 215 generates the thick solution which is thicker than the thickness of a mixture of the thick solutions generated in the low-temperature regenerator 202 and the high-temperature regenerator 201, respectively. The thick solution generated in the regenerating chamber 215 is supplied to the absorber 205. As described above, the cycle is formed in such a manner that the high-temperature regenerator 201 and the low-temperature regenerator 202 shift to left, that is, in the low temperature side, while the absorber 205 sifts to right, that is, in the high temperature side. As a result, the difference in the heat exchange temperature from cooling air, which is the cooling medium, can be enlarged in the portion adjacent to the absorber 205, which is the radiation position. Therefore, an effect can be obtained in that the size of the apparatus can be reduced.

Figure 13:
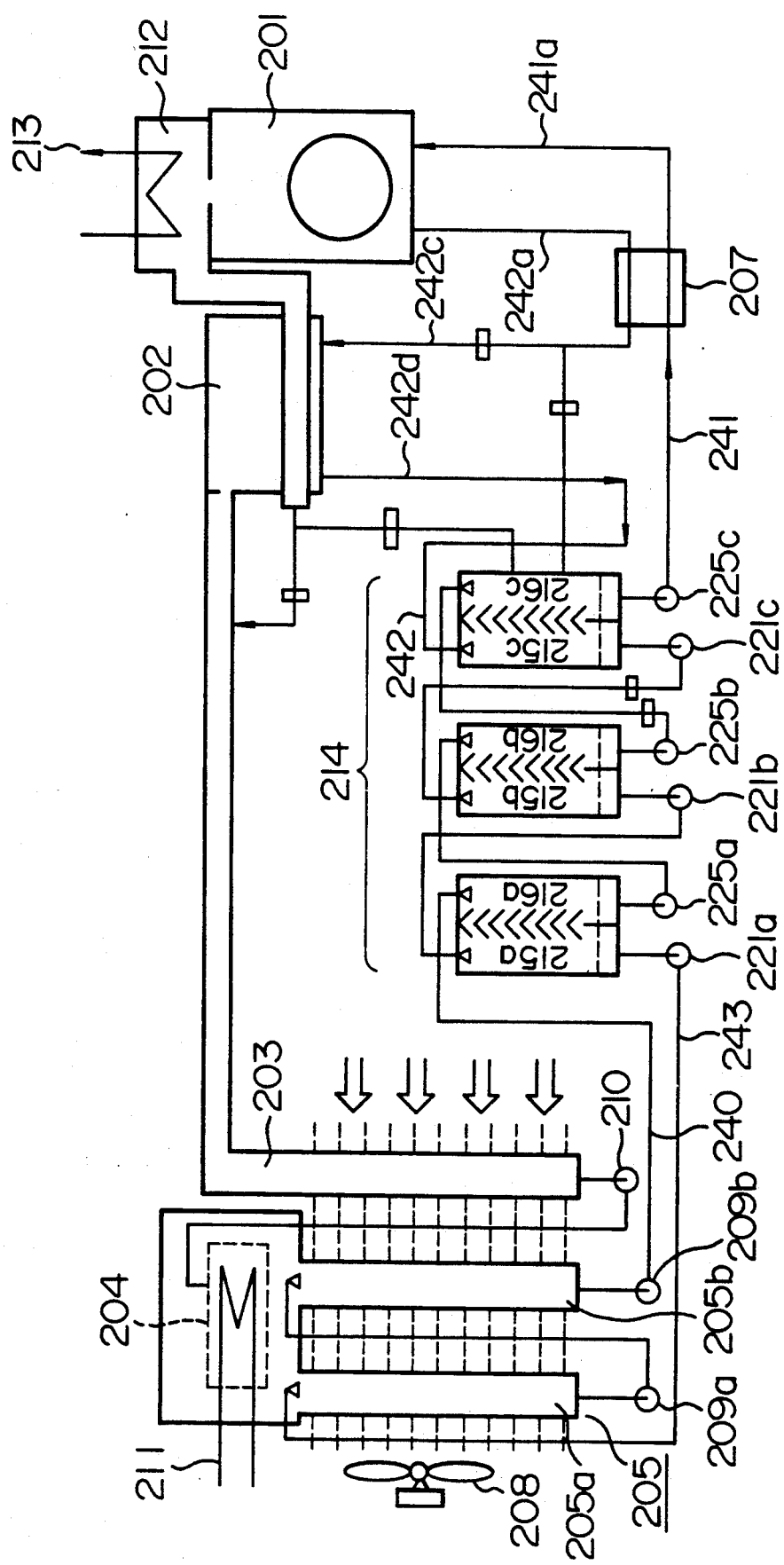
FIG. 13 illustrates the cycle system according to another embodiment of the present invention.
Figure 14:
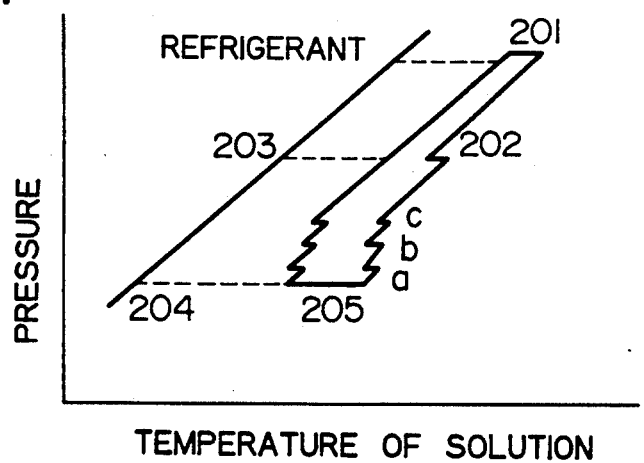
FIG. 14 is a Duehring's diagram of the cycle shown in FIG. 13.

FIG. 13 illustrates the cycle system of another embodiment of the present invention. FIG. 14 is a Duehring's diagram about the cycle shown in FIG. 13.

The difference between this embodiment shown in FIG. 13 and that shown in FIG. 9 lies in the system of the flow in the solution circulation system.

The dilute solution generated in the absorber 205 first passes through the heat-substance exchanging unit 214 before it is sent to the high-temperature regenerator 201 via the pipe 241, the high-temperature heat exchanger 207 and a pipe 241a so as to be condensed. The generated thick solution is sent to the low-temperature regenerator 202 via the pipe 242a, the high-temperature heat exchanger 207 and the pipe 242c so as to be further condensed before it is returned to the absorber 205 via the pipes 242d, 242 and the heat-substance exchanging unit 214. Thus, a so-called series flow system is constructed.

In this case, since the density of the solution in the low-temperature regenerator 202 is thick since it has been previously condensed by the high-temperature regenerator 201, the operational pressure for the high-temperature regenerator 201 is relatively higher than that required in the parallel flow system according to the embodiment shown in FIG. 9. In particular, there arises a risk of the above-described pressure exceeds the atmospheric pressure in an air-cooled absorption air conditioner. If the density of the solution in the low-temperature regenerator 202 is thick, also the temperature of the solution which balances the pressure of the condenser 203 is raised. Therefore, the condensation temperature for vapor generated in the high-temperature regenerator 201, which serves as the source for heating the solution, is raised, causing the However, as shown in the Duehring's diagram of FIG. 14, the heat-substance exchanging unit 214 acts to shift the portion including the regenerator to the low temperature side and the portion including the absorber to the high temperature side. Therefore, the density of the solution in the low-temperature regenerator 2 may be thinner than the density of the solution returning to the absorber 205. As a result, an effect can be obtained in that a safety air-cooled absorption air conditioner can be provided because the operational pressure can be lowered.

According to the embodiment shown in FIG. 13, the flush evaporating chamber 227 is omitted from the structure. The structure according to this embodiment is arranged to be the same as that according to the embodiments shown in FIGS. 9 and 10 in that the heat-substance exchanging unit 214 is composed of three sections and vapor of the refrigerant generated in the regenerating chamber 215 is moved to the absorption chamber 216 disposed horizontally. The same function can be obtained in a vertical structure in which the regenerating chamber 215 and the absorption chamber 216 are vertically stacked. The description about it is omitted here.

Figure 16:
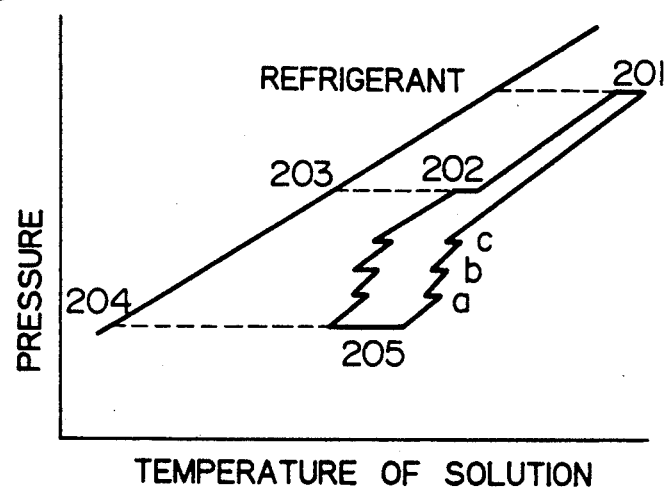
FIG. 16 is a Duehring's diagram of the cycle shown in FIG. 15.
Figure 15:
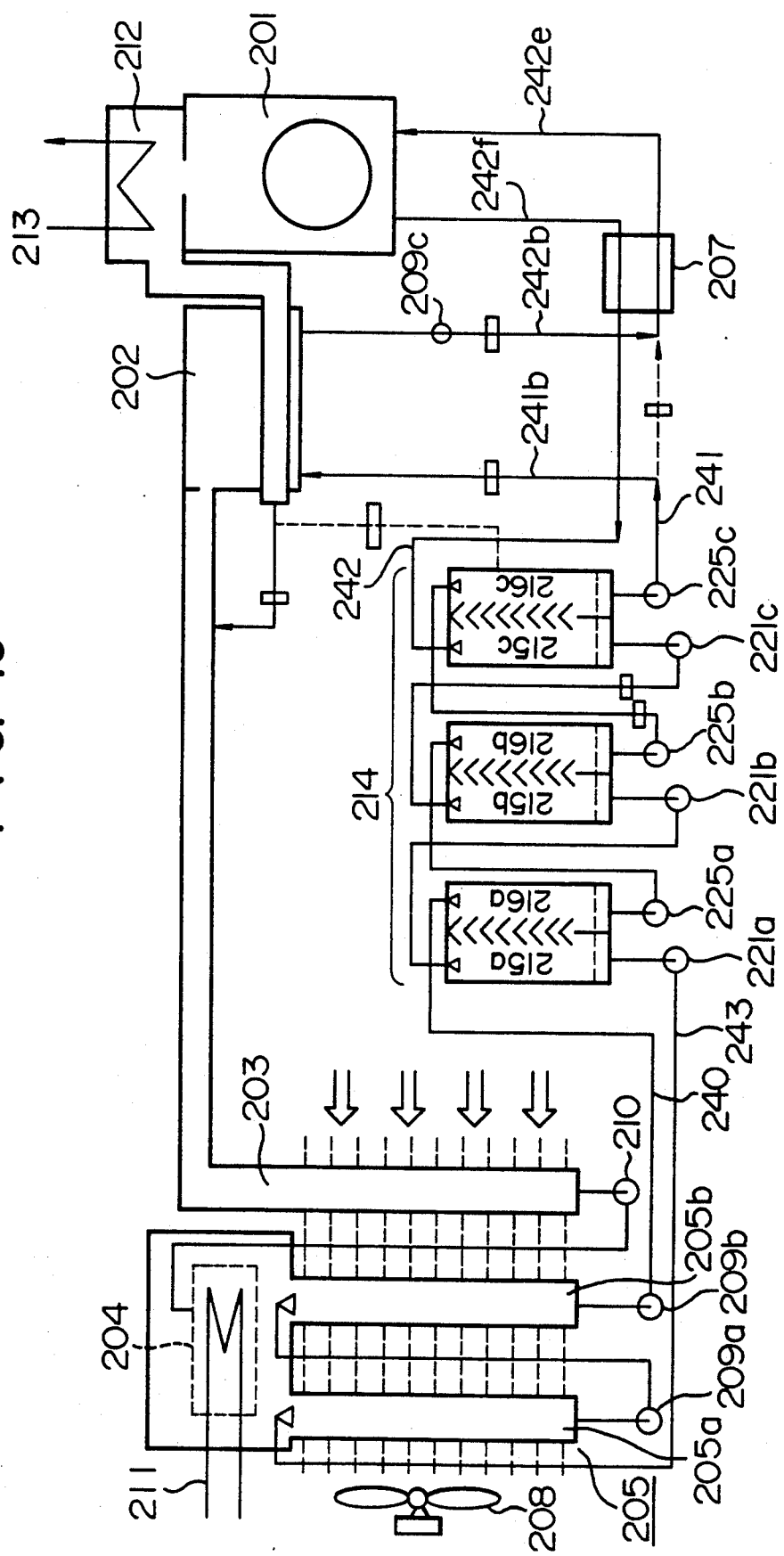
FIG. 15 illustrates the cycle system according to another embodiment of the present invention.

FIG. 15 illustrates the cycle system according to another embodiment of the present invention. FIG. 16 is a Duehring's diagram of the cycle according to this embodiment shown in FIG. 15.

The difference between this embodiment shown in FIG. 15 and that shown in FIG. 9 lies in the system of the flow in the solution circulation system.

The dilute solution generated in the absorber 205 first passes through the heat-substance exchanging unit 214 before it is sent to the low-temperature regenerator 202 via the pipes 241 and 241b to be condensed. It is then sent to the high-temperature regenerator 201 by the solution pump 209c via the pipe 242b, the high-temperature heat exchanger 207 and a pipe 242e to be condensed to a high density. The condensed solution is sent to the high-temperature heat exchanger 7 via a pipe 42f before it is returned to the absorber 5 through the pipe 42 via the heat-substance exchanging unit 14. Thus, a so-called reverse cycle system is constructed.

According to this system constructed, the absorption temperature level of the absorber 5 can be shifted to the high temperature side as shown in the Duehring's diagram shown in FIG. 16. Therefore, the difference in the heat exchange temperature between the solution in the absorber 5 and cooling air can be enlarged. Therefore, an effect can be obtained in that the size of the absorber 5 can be reduced. Furthermore, since another effect can be obtained in that the difference between the temperature at the outlet port for cooling air and that of the inlet port for the same can be enlarged, the quantity required to perform the cooling operation can be reduced, causing an effect to be obtained in that a low noise air-cooled absorption air conditioner can be provided.

Figure 18:
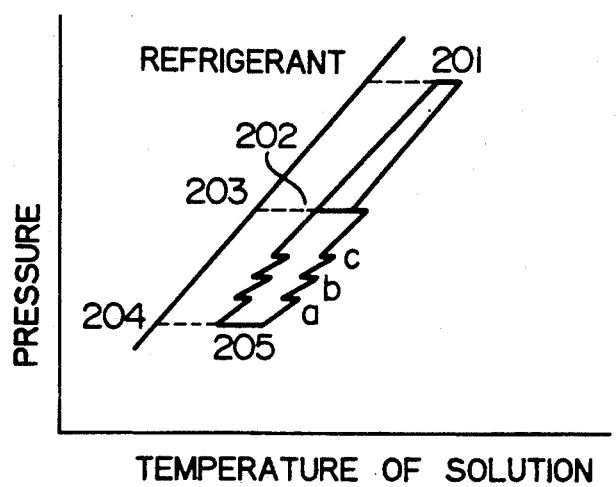
FIG. 18 is a Duehring's diagram of the cycle shown in FIG. 17.
Figure 17:
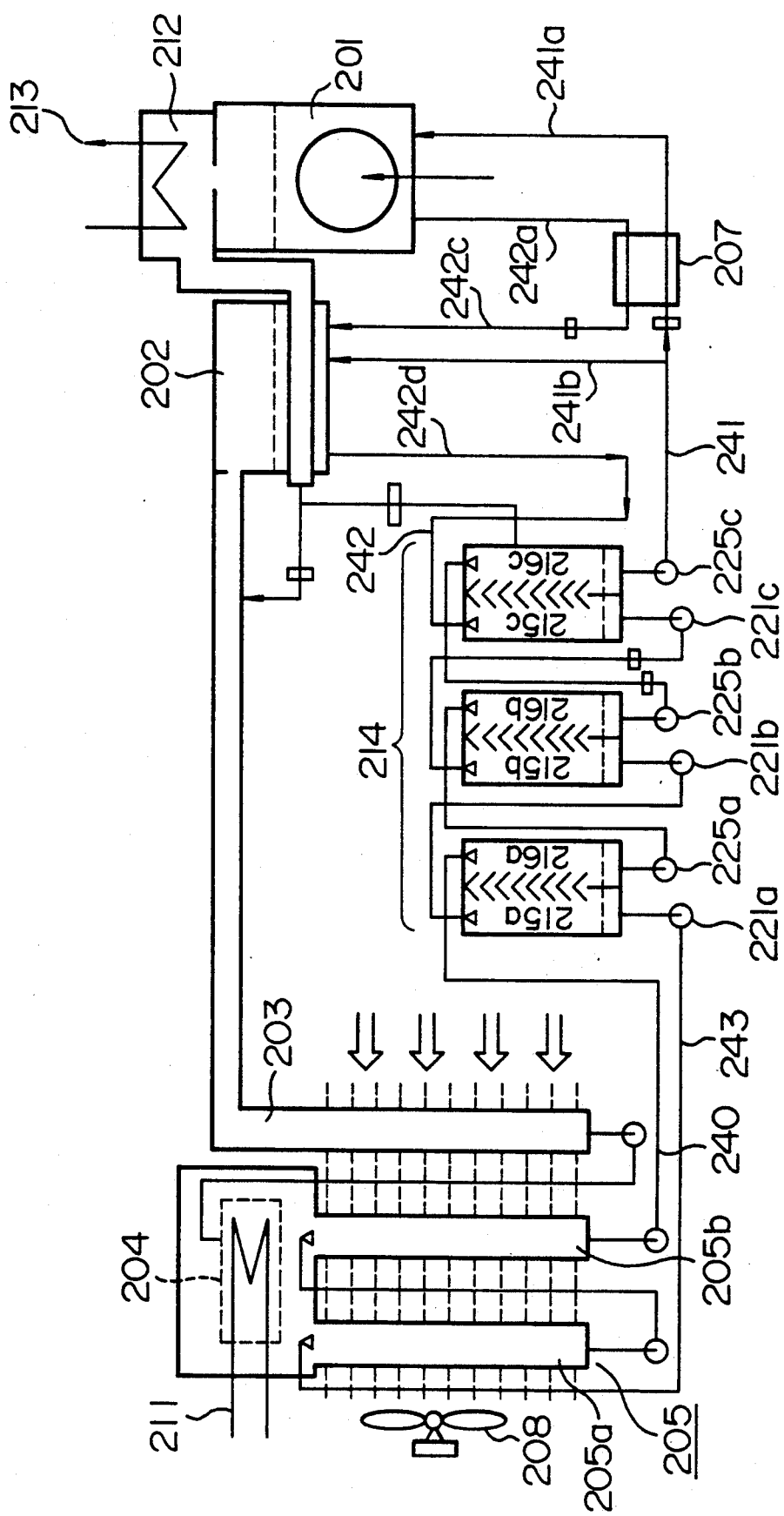
FIG. 17 illustrates the cycle system according to another embodiment of the present invention.

FIG. 17 illustrates the cycle system according to another embodiment of the present invention. FIG. 18 is a Duehring's diagram for the cycle shown in FIG. 17.

The difference between this embodiment shown in FIG. 17 and that shown in FIG. 9 lies in the method of the flow in the solution circulation system.

The dilute solution generated in the absorber 205 is, first bisectioned after it has passed through the heat-substance exchanging unit 214. A portion of the bisectioned dilute solution is sent to the low-temperature regenerator 202 via the pipe 241b so as to be condensed. Another portion of the same is sent to the high-temperature regenerator 201 via the pipe 241a after it has passed through the high-temperature heat exchanger 207. The condensed solution passes through the high-temperature heat exchanger 207 through the pipe 242a before it is introduced into the low-temperature regenerator 202 through the pipe 242c so as to be further condensed. Then, the further-condensed solution is returned to the absorber 205 through the pipes 242d and 242 after it has passed through the heat-substance exchanging unit 214. Thus, a structured construction by combining the parallel flow and the series flow cycles is achieved.

Also according to this system, as shown in the Duehring's diagram shown in FIG. 18, the absorption temperature level at the absorber 205 can be shifted to the high temperature side. Therefore, the heat exchange temperature difference between the solution in the absorber 205 and cooling air can be enlarged. As a result, an effect can be obtained in that the size of the absorber 205 can be reduced. Furthermore, since an effect can be obtained in that the difference between the temperature at the outlet port for cooling air and that of the inlet port for the same can be enlarged, the quantity required to perform the cooling operation can be reduced, causing an effect to be obtained in that a low noise air-cooled absorption air conditioner can be provided.

The liquid level in the heat-substance exchange device 214 may be adjusted by utilizing a decrease in the liquid transfer quantity due to the lack of the NPSH (Net Positive Suction Head) of a uni-axial multi-pump. Even if the NPSH for each pump is too small, idling of the other pump will arise no problem by protecting only the impeller affecting the cooling of the canned motor by means of re-circulating the solution or the like. By using a uni-axial multi-pump of the above-described type, an effect can be obtained in that a heat-substance exchanging unit capable of reducing the required quantity of the solution and efficiently performing the heat-substance exchange operation.

Although the above-described embodiments are arranged in such a manner that a plurality of absorbing-/reproducing chamber units are arranged at certain intervals, the present invention is not limited to this. Although omitted from the illustration, another structure may be employed which is arranged in such a manner that a plurality of the absorption chambers and a plurality of the reproducing chambers are adjacently and closely disposed to one another. As a result, the required quantity of the material of each shell can be saved so that the size of the heat-substance exchanging unit can be reduced.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. An absorption air conditioner having an evaporator, an absorber for discharging a dilute solution, a regenerator, a condenser and a first conduit for connecting the evaporator, the absorber, the regenerator and the condenser, said absorption air conditioner comprising:

a regenerating chamber for generating a refrigerant and an absorbing chamber connected to each other by a passage for vapor;

means disposed in said regenerating chamber and for heating said dilute solution;

a second conduit for conducting a portion of said dilute solution discharged from said absorber to said regenerating chamber;

a third conduit for returning, to said absorber, a solution obtained by condensing vapor of said refrigerant generated in said regenerating chamber; and a fourth conduit for conducting, after a residual portion of said dilute solution discharged from said absorber has been introduced into said absorption chamber and said vapor of said refrigerant generated in said regenerating chamber has been absorbed by said residual portion of said dilute solution, said dilute solution to said regenerator.

2. An absorption air conditioner according to claim 1, wherein said absorption air conditioner further comprises a liquid heat exchanger for exchanging heat between said solution which has not been condensed and said solution which has been condensed being disposed at an intermediate position of said fourth conduit for conducting said residual portion of said dilute solution in said absorber so as to condense it and returning it to said absorber.

3. An absorption air conditioner according to claim 1, wherein said dilute solution heating means in said regenerating chamber is a high-temperature fluid in a cycle between the regenerator and the absorber.

4. An absorption air conditioner according to claim 1, wherein said dilute solution heating means in said regenerating chamber is heat exhausted from a source for heating said regenerator.

5. An absorption air conditioner according to claim 3, wherein said high temperature fluid is a thick solution to be sent from said regenerator to said absorber.

6. An absorption air conditioner according to claim 3, wherein said regenerator includes a low-temperature regenerator, and wherein said high temperature fluid is refrigerant vapor and condensed water after said low-temperature regenerator has been heated.

7. An absorption air conditioner including an evaporator, an air-cooled absorber for discharging a dilute solution, a regenerator including a low-temperature regenerator and a first conduit for connecting the evaporator, the air-cooled absorber and the regenerator, said absorption air conditioner comprising:

a regenerating chamber for generating a refrigerant and an absorption chamber connected to each other by a passage for vapor;

means disposed in said regenerating chamber for heating a solution;

a second conduit for conducting a portion of said dilute solution discharged from said air-cooled absorber to said regenerating chamber;

a third conduit for conducting, to said air-cooled absorber, a solution obtained by condensing vapor of said refrigerant generated in said regenerating chamber; and a fourth conduit for conducting, after a residual portion of said dilute solution discharged form said air-cooled absorber has been introduced into said absorption chamber and said vapor of said refrigerant generated in said regenerating chamber has been absorbed by said residual dilute solution, said dilute solution to said low-temperature regenerator.

8. An absorption air conditioner including an evaporator, an air-cooled absorber for discharging a dilute solution, a regenerator including a high-temperature regenerator and a first conduit for connecting the evaporator, the air-cooled absorber and the regenerator, said absorption air conditioner comprising:

a regenerating chamber for generating a refrigerant and an absorption chamber connected to each other by a passage for vapor;

means disposed in said regenerating chamber for heating a solution;

a second conduit for conducting a portion of said dilute solution discharged from said air-cooled absorber to said regenerating chamber;

a third conduit for conducting, to said air-cooled absorber, said dilute solution obtained by condensing vapor of said refrigerant generated in said regenerating chamber; and a fourth conduit arranged to conduct, after a residual portion of said dilute solution discharged from said air-cooled absorber has been introduced into said absorption chamber and said vapor of said refrigerant generated in said regenerating chamber has been absorbed by said residual dilute solution, said dilute solution to said high-temperature regenerator.

9. An absorption air conditioner including an evaporator, an air-cooled absorber for discharging a dilute solution, a regenerator having a low-temperature regenerator and a high-temperature regenerator and a first conduit for connecting the evaporator, the air-cooled absorber and the regenerator, said absorption air conditioner comprising:

a regenerating chamber for generating a refrigerant and an absorption chamber connected to each other by a passage for vapor;

means disposed in said regenerating chamber for heating a solution;

a second conduit for conducting a portion of said dilute solution discharged from said air-cooled absorber to said regenerating chamber;

a third conduit for conducting, to said air-cooled absorber, said dilute solution obtained by condensing vapor of said refrigerant generated in said regenerating chamber; and a fourth conduit arranged to conduct, after a residual portion of said dilute solution discharged from said air-cooled absorber has been introduced into said absorption chamber and said vapor of said refrigerant generated in said regenerating chamber has been absorbed by said residual portion of said dilute solution, said dilute solution to said low-temperature regenerator and said high-temperature regenerator.

10. An absorption air conditioner including an evaporator, an absorber for discharging a dilute solution, a regenerator, a condenser and a first conduit for connecting the evaporator, the absorber, the regenerator and the condenser, said absorption air conditioner comprising:

a regenerating chamber for generating a refrigerant and an absorption chamber connected to each other by a passage for vapor;

means disposed in said regenerating chamber for heating a solution;

a second conduit for conducting a portion of said dilute solution discharged from said absorber to said regenerating chamber;

a third conduit for conducting, to said absorber, a solution obtained by condensing vapor of said refrigerant generated in said regenerating chamber; and a fourth conduit arranged to conduct, after a residual portion of said dilute solution discharged from said absorber has been introduced into said absorption chamber and said vapor of said refrigerant generated in said regenerating chamber has been absorbed by said residual portion of said dilute solution, said dilute solution to a regenerator; and means for cooling said solution in said absorption chamber.

11. An absorption air conditioner according to claim 10, wherein said means for cooling said solution in said absorption chamber is medium-temperature water to be supplied or to be used for heating.

12. An absorption air conditioner having a high-temperature regenerator, a low-temperature regenerator, an air-cooled condenser, an evaporator, an air-cooled absorber for generating a dilute solution, a high-temperature heat exchanger, a low-temperature heat exchanger, a solution pump, a refrigerant pump and a piping system for connecting the high-temperature regenerator, the low-temperature regenerator, the air-cooled condenser, the evaporator, the air-cooled absorber, the high-temperature heat exchanger, the low-temperature heat exchanger, the solution pump and the refrigerant pump to operate the high-temperature regenerator, the low-temperature regenerator, the air-cooled condenser, the evaporator, the air-cooled absorber, the high-temperature heat exchanger, the low-temperature heat exchanger, the solution pump and the refrigerant pump, said absorption air conditioner comprising an absorbing/regenerating chamber unit including:
at least one regenerating chamber for introducing a thick solution, which returns from one of said high-temperature regenerator or said low-temperature regenerator to said air-cooled absorber, so as to flush evaporate it,
at least one absorption chamber for absorbing vapor of a refrigerant which has been flush-evaporated into the dilute solution generated in said air-cooled absorber, said regenerating chamber being opposed to said absorption chamber, and solution removal means interposed between said regenerating chamber and said absorption chamber.

13. An absorption air conditioner according to claim 12, wherein said absorption air conditioner further comprises a plurality of absorbing/regenerating chamber units connected to said piping system, wherein said absorbing/regenerating chamber units include a first unit connected to said air-cooled absorber and a final unit connected to said regenerator.

14. An absorption air conditioner according to claim 13, wherein said absorption air conditioner further comprises a plurality of regenerating chambers, and wherein each of said regenerating chambers of said plurality of said absorbing/regenerating chamber units includes
solution spreading means, droplet removal means, a solution pump and gas-liquid interfacial area enlarging means disposed below said solution spreading means, said gas-liquid interfacial area enlarging means having a plurality of wave or sawtooth shaped net-like materials alternately disposed and an opening formed in a horizontal direction, and
wherein each of said regenerating chambers of said absorbing/regenerating chamber units is connected to the opposing absorption chamber, said droplet removal means being interposed between said regenerating chamber and said absorption chamber, and
wherein each of said regenerating chambers of said absorbing/regenerating chamber units is connected to either of an adjacent solution spreading means or said air-cooled absorber via said solution pump.

15. An absorption air conditioner according to claim 13, wherein said absorption air conditioner further comprises a plurality of regenerating chambers, and wherein each of said regenerating chambers of said absorbing/regenerating chamber units includes
solution spreading means, droplet removal means, a solution pump and gas-liquid interfacial area enlarging means disposed below said solution spreading means, said gas-liquid interfacial area enlarging means having a plurality of wave or sawtooth shaped net-like materials alternatively disposed and an opening formed in the horizontal direction, and
wherein each of said regenerating chambers of said absorbing/regenerating chamber units is connected to the opposing regenerating chamber, said droplet removal means being interposed between said regenerating chamber and said absorption chamber, and
wherein each of said regenerating chambers of said absorbing/regenerating chamber units is connected to any one of said solution spreading means, said low-temperature heat exchanger or said high-temperature heat exchanger of an adjacent absorption chamber via said solution pump.

16. An absorption air conditioner according to claim 13, wherein said absorption air conditioner further comprises a plurality of said absorption chambers and a plurality of said regenerating chambers disposed adjacent to and close to each other.

17. An absorption air conditioner according to claim 13, wherein said plurality of said absorbing/regenerating chamber units are connected to one another by communicating means having a liquid seal.

18. An absorption air conditioner according to claim 12, wherein said absorbing/regenerating chamber unit includes a solution pump of a uni-axial multi-pump type, said solution pump being disposed in a circulation passage for said solution in said absorbing/regenerating chamber unit.

19. An absorption air conditioner including an evaporator, an absorber for discharging a dilute solution, a regenerator and a condenser, said absorption air conditioner comprising:
a sub-regenerating chamber for discharging refrigerant vapor disposed between said absorber and said regenerator, said sub-regenerating chamber evaporating the refrigerant vapor to condense the dilute solution; and
a sub-absorption chamber for absorbing the refrigerant vapor discharged from said sub-regenerating chamber.

20. An absorption air conditioner according to claim 12, wherein said absorption air conditioner further comprises a plurality of regenerating chambers of a plurality of absorbing/regenerating chamber units, and wherein each of said regenerating chambers of said plurality of said absorbing/regenerating chamber units includes
solution spreading means, droplet removal means, a solution pump and gas-liquid interfacial area enlarging means disposed below said solution spreading means, said gas-liquid interfacial area enlarging means having a plurality of wave or sawtooth shaped net-like materials alternately disposed and an opening formed in a horizontal direction, and wherein each of said regenerating chambers of said absorbing/regenerating chamber units is connected to the opposing absorption chamber, said droplet removal means being interposed between said regenerating chamber and said absorption chamber, and wherein each of said regenerating chambers of said absorbing/regenerating chamber units is connected to either of an adjacent solution spreading means or said air-cooled absorber via said solution pump.

21. An absorption air conditioner according to claim 12, wherein said absorption air conditioner further comprises a plurality of regenerating chambers of a plurality of absorbing/regenerating chamber units, and wherein each of said regenerating chambers of said absorbing/regenerating chamber units includes solution spreading means, droplet removal means, a solution pump and gas-liquid interfacial area enlarging means disposed below said solution spreading means, said gas-liquid interfacial area enlarging means having a plurality of wave or sawtooth shaped net-like materials and an opening formed in a horizontal direction, and wherein each of said regenerating chambers of said absorbing/regenerating chamber units is connected to the opposing regenerating chamber, said droplet removal means being interposed between said regenerating chamber and said absorption chamber, and wherein each of said regenerating chambers of said absorbing/regenerating chamber units is connected to any one of said solution spreading means, said low-temperature heat exchanger or said high-temperature heat exchanger of an adjacent absorption chamber via said solution pump.

22. An absorption air conditioner according to claim 12, wherein said absorption air conditioner further comprises a plurality of said absorption chambers and a plurality of said regenerating chambers disposed adjacent to and close to each other.

23. An absorption air conditioner according to claim 12, wherein said plurality of said absorbing/regenerating chamber units are connected to one another by communicating means having a liquid seal.

* * * * *